US012284389B2

(12) United States Patent
Stoica et al.

(10) Patent No.: US 12,284,389 B2
(45) Date of Patent: *Apr. 22, 2025

(54) VIDEO CODEC AWARE RADIO ACCESS NETWORK CONFIGURATION AND UNEQUAL ERROR PROTECTION CODING

(71) Applicant: Lenovo (Singapore) Pte. Ltd., New Tech Park (SG)

(72) Inventors: Razvan-Andrei Stoica, Essen (DE); Hossein Bagheri, Urbana, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,580

(22) Filed: Dec. 26, 2023

(65) Prior Publication Data

US 2024/0187650 A1 Jun. 6, 2024

Related U.S. Application Data

(63) Continuation of application No. 17/555,137, filed on Dec. 17, 2021, now Pat. No. 11,917,206.

(51) Int. Cl.
*H04N 19/67* (2014.01)
*H04L 1/00* (2006.01)
*H04N 19/89* (2014.01)

(52) U.S. Cl.
CPC .......... *H04N 19/67* (2014.11); *H04L 1/0041* (2013.01); *H04L 1/0086* (2013.01); *H04N 19/89* (2014.11)

(58) Field of Classification Search
CPC ...... H04N 19/67; H04N 19/89; H04L 1/0041; H04L 1/0086
See application file for complete search history.

(56) References Cited

U.S. PATENT DOCUMENTS 6,404,817 B1 6/2002 Saha et al.
6,754,278 B1 6/2004 Suh et al.
(Continued)

FOREIGN PATENT DOCUMENTS

EP 3041195 A1 1/2008
EP 2574010 A2 9/2012
(Continued)

OTHER PUBLICATIONS

3GPP, "3rd Generation Partnership Project; Technical Specification Group Services and System Aspects; Extended Reality (XR) in 5G (Release 16)", 3GPP TR 26.928 V16.1.0, Dec. 2020, pp. 1-131.
(Continued)

*Primary Examiner* — Justin R Knapp
(74) *Attorney, Agent, or Firm* — Kunzler Bean & Adamson

(57) ABSTRACT

Various aspects of the present disclosure relate to video codec aware RAN configuration and unequal error protection coding. An apparatus includes a memory and a processor coupled to the memory that is configured to cause the apparatus to detect a video coded traffic stream and a video codec profile for encoding the video coded traffic stream, determine an awareness of PDU sets of the video coded traffic stream, align, based on at least the awareness of PDU sets, each PDU set of the video coded traffic stream to PHY transport elements and channel coding element partitions for a video coded traffic aware PHY transport, determine a channel coding rate allocation of the channel coding element partitions based on the video coded traffic aware PHY transport, and apply a FEC coding to the channel coding element partitions based in part on the channel coding rate allocation.

20 Claims, 13 Drawing Sheets

(56) References Cited

U.S. PATENT DOCUMENTS

| | | |
|---|---|---|
| 6,909,450 B2 | 6/2005 | Paulin |
| 6,964,021 B2 | 11/2005 | Jun et al. |
| 7,778,242 B1 | 8/2010 | Barany et al. |
| 7,864,805 B2 | 1/2011 | Hannuksela |
| 7,886,201 B2 | 2/2011 | Shi et al. |
| 7,974,341 B2 | 7/2011 | Chen et al. |
| 7,987,415 B2 | 7/2011 | Niu et al. |
| 8,374,254 B2 | 2/2013 | Camp et al. |
| 8,599,316 B2 | 12/2013 | Deever |
| 8,605,221 B2 | 12/2013 | Deever |
| 8,621,320 B2 | 12/2013 | Yang et al. |
| 8,654,834 B2 | 2/2014 | Cho et al. |
| 8,989,559 B2 | 3/2015 | Chen et al. |
| 9,083,474 B2 | 7/2015 | Krishnaswamy et al. |
| 9,386,326 B2 | 7/2016 | Noru et al. |
| 9,432,298 B1 | 8/2016 | Smith |
| 9,584,258 B2 * | 2/2017 | Oh .................. H04N 19/89 |
| 10,015,486 B2 | 7/2018 | Kumar et al. |
| 10,110,348 B2 | 10/2018 | Maaref |
| 10,616,383 B2 * | 4/2020 | Mobasher ............ H04L 1/0083 |
| 10,764,574 B2 | 9/2020 | Teo et al. |
| 11,562,565 B2 | 1/2023 | Cristache |
| 2002/0146074 A1 | 10/2002 | Ariel et al. |
| 2009/0213938 A1 | 8/2009 | Lee et al. |
| 2011/0090921 A1 | 4/2011 | Anthru et al. |
| 2015/0349915 A1 | 12/2015 | Eum |
| 2019/0075308 A1 | 3/2019 | Wei et al. |
| 2020/0106554 A1 | 4/2020 | Chendamarai Kannan et al. |
| 2020/0157058 A1 | 5/2020 | Lee et al. |
| 2020/0195946 A1 | 6/2020 | Choi et al. |
| 2020/0287654 A1 | 9/2020 | Xi et al. |
| 2020/0351936 A1 | 11/2020 | Kunt et al. |
| 2021/0028893 A1 | 1/2021 | Hwang et al. |
| 2021/0099715 A1 | 4/2021 | Topiwala et al. |
| 2021/0174155 A1 | 6/2021 | Smith et al. |
| 2021/0320956 A1 | 10/2021 | Berliner et al. |
| 2022/0413741 A1 | 12/2022 | Livis et al. |
| 2024/0049308 A1 * | 2/2024 | Xue .................... H04L 67/131 |

FOREIGN PATENT DOCUMENTS

| | | |
|---|---|---|
| WO | 2008066257 A1 | 6/2008 |
| WO | 2020139921 A1 | 7/2020 |

OTHER PUBLICATIONS

"Series H: Audiovisual and Multimedia Systems Infrastructure of audiovisual services—Coding of moving video", International Telecommunication Union (ITU) H.266, Aug. 2020, pp. 1-516.

3GPP, "3rd Generation Partnership Project; Technical Specification Group Radio Access Network; NR; Multiplexing and channel coding (Release 16)", 3GPP TS 38.212 V16.7.0, Sep. 2021, pp. 1-153.

3GPP, "3rd Generation Partnership Project; Technical Specification Group Radio Access Network; NR; Physical layer procedures for data (Release 16)", 3GPP TS 38.214 V16.7.0, Sep. 2021, pp. 1-172.

Mediatek Inc., "Further Potential XR Enhancements", 3GPP TSG RAN WG1 Meeting #106bis-e R1-2109556, Oct. 11-19, 2021, pp. 1-7.

Moderator of XR Enhancements (NOKIA), "Moderator's Summary on "[RAN94e-R18Prep-aa] Enchacements for XR"", 3GPP TSG RAN#04 RP-212671, Dec. 6-17, 2021, pp. 1-54.

Nokia, "New SID on XR Enhancements for NR", 3GPP TSG RAN Meeting #94e RP-212711, Dec. 6-17, 2021, pp. 1-5.

Qualcomm Incoropared, "FS_XRTraffic: Permanent document, v0.8.0", 3GPP TSG-SA4 Meeting #115e S4-211210, Aug. 18-27, 2021, pp. 1-130.

3GPP, "3rd Generation Partnership Project; Technical Specification Group Services and System Aspects; System architecture for the 5G System (5GS); Stage 2 (Release 17)", 3GPP TS 23.501 V17.2.0, Sep. 2021, pp. 1-542.

3GPP, "3rd Generation Partnership Project; Technical Specification Group Services and System Aspects; Transparent end-to-end packet switched streaming service (PSS); 3GPP file format (3GP) (Release 16)", 3GPP TS 26.244 V16.1.0, Sep. 2020, pp. 1-68.

P. De Rivaz et al., "AV1 Bitstream & Decoding Process Specification", The Alliance for Open Media, Version 1.0.0 with Errata 1, Jan. 8, 2019, pp. 1-681.

F. Rahmani et al., "Compressed domain visual information retrieval based on I-frames in HEVC", Multimed Tools Appl, Feb. 23, 2016, pp. 1-18.

"Series H: Audiovisual and Multimedia Systems Infrastructure of audiovisual services—Coding of moving video Advanced video coding for generic audiovisual services", International Telecommunication Union (ITU) H.264, Aug. 2021, pp. 1-844.

"Series H: Audiovisual and Multimedia Systems Infrastructure of audiovisual services—Coding of moving video High efficiency video coding", International Telecommunication Union (ITU) H.265, Aug. 2021, pp. 1-716.

F. Zargari et al., "Visual Information Retrieval in HEVC Compressed Domain", 2015 23rd Iranina Conference on Electrical Engineering (ICEE), May 10-14, 2015, pp. 793-798.

Ashfaq et al., "Hybrid Automatic repeat Request (HARQ) in Wireless Communications Systems and Standards: A Contemporary Survey", IEEE Communications Surveys & Tutorials, vol. 23, No. 4, July 2, 1021, pp. 1-42.

Ducla-Soares et al., "Error resilience and concealment performance for MPEG-4 frame-based video coding", Signal Processing. Image Communication, Elsevier Science Publishers, May 1, 1999, pp. 1-26.

Gao, "Flow-edge Guided Video Completion", European Conference on Computer Vision, Aug. 2020, pp. 1-17.

Ericsson, "CSI Feedback Enhancements for IIoT/URLLC", 3GPP TSG-RAN WG1 Meeting #104-e Tdoc R1-2100269, Jan. 25-Feb. 5, 2021, pp. 1-12.

Qualcomm Inc., "CSI enhancement for IoT and URLLC", 3GPP TSG RAN WG1 #104-e R1-2101460, Jan. 25-Feb. 5, 2021, pp. 1-18.

Sankisa, et al., "Video error concealment using deep neural networks", 2018 25th IEEE International Conference on Image Processing (ICIP), Oct. 2018, pp. 1-5.

Shahriari et al., "Adaptive Error Concealment With Radial Basis Neuro-Fuzzy Networks For Video Communication over Lossy Channels," First International Conference on Industrial and Information Systems, Aug. 8-11, 2006, pp. 1-3.

Shannon, "A Mathematical Theory of Communication" The Bell System Technical Journal, vol. 27, Oct. 1948, pp. 1-55.

Strinati, et al., "6G Networks: Beyond Shannon Towards Semantic and Goal-Oriented Communications", Computer Networks, Feb. 17, 2021, pp. 1-52.

3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

Ulyanov, et al., "Deep Image Prior", Proceedings of the IEEE Conference on Computer Vision and Pattern Recognition, 2018, pp. 1-9.

Zhang, et al., "Intelligent Image and Video Compression: Communicating Pictures", Academic Press; 2nd edition, Apr. 7, 2021, pp. 1-2.

Yip et al., "Joint source and channel coding for H.264 compliant stereoscopic video transmission", Electrical and Computer Engineering, IEEE, May 1, 2005, pp. 1-5.

Dung et al., "Unequal Error Protection for H.26L Video Transmission", Wireless Personal Multimedia Communications, IEEE, Oct. 27, 2002, pp. 1-6.

Naghdinezhad et al., "Frame distortion estimation for unequal error protection methods in scalable video coding (SVC)", Signal Processing, Elsevier Science Publishers, Jul. 30, 2014, pp. 1-16.

(56) References Cited

OTHER PUBLICATIONS

Perera et al., "QoE aware resource allocation for video communications over LTE based mobile networks", 10th International Conference on Heterogeneous Networking for Quality, Reliability, Security and Robustness, ICST, Aug. 18, 2014, pp. 1-8.
U.S. Appl. No. 17/555,121 Office Action Summary, USPTO, Aug. 16, 2024, pp. 1-43.
U.S. Appl. No. 18/317,781 Office Action Summary, USPTO, Jul. 25, 2024, pp. 1-32.
U.S. Appl. No. 18/317,781 Office Action Summary, USPTO, Nov. 12, 2024, pp. 1-8.

\* cited by examiner

VIDEO CODEC AWARE RADIO ACCESS NETWORK CONFIGURATION AND UNEQUAL ERROR PROTECTION CODING

CROSS-REFERENCE TO RELATED APPLICATIONS

This is a continuation application of and claims priority to U.S. patent application Ser. No. 17/555,137 entitled "VIDEO CODEC AWARE RADIO ACCESS NETWORK CONFIGURATION AND UNEQUAL ERROR PROTECTION CODING" and filed on Dec. 17, 2021, for Razvan-Andrei Stoica, et. al, which is incorporated herein by reference.

FIELD

The subject matter disclosed herein relates generally to wireless communications and more particularly relates to video codec aware radio access network configuration and unequal error protection coding.

BACKGROUND

In wireless networks, emerging applications such as augmented reality ("AR")/virtual reality ("VR")/extended reality ("XR"), cloud gaming ("CG"), device remote tele-operation (e.g., vehicle tele-operation, robot arms tele-operation, or the like), 3D video conferencing, smart remote education, or the like are expected to drive increase in video traffic. Even though the foregoing applications may require different quantitative constraints and configurations in terms of rate, reliability, latency, and quality of service ("QoS"), it is expected that such constraint sets will challenge current and future communications networks in delivering a high-fidelity quality of experience ("QoE") at ever increasing resolutions. As the quality of rendering end devices will increase and their costs will decrease with time, such applications are expected to steadily expand and furthermore also increase the bar on the QoE of end applications. As such it is of high interest to provide scalable and reliable solutions from a communications network perspective for the next generation media content delivery systems and their immersive digital reality applications.

BRIEF SUMMARY

Disclosed are procedures for video codec aware radio access network ("RAN") configuration and unequal error protection coding. Said procedures may be implemented by apparatus, systems, methods, and/or computer program products.

Some implementations of the method and apparatuses described herein may further include a memory and a processor coupled to the memory that is configured to cause the apparatus to detect a video coded traffic stream and a video codec profile for encoding the video coded traffic stream, determine an awareness of protocol data unit ("PDU") sets of the video coded traffic stream, align, based on at least the awareness of PDU sets, each PDU set of the video coded traffic stream to physical layer ("PHY") transport elements and channel coding element partitions for a video coded traffic aware PHY transport, determine a channel coding rate allocation of the channel coding element partitions based on the video coded traffic aware PHY transport, and apply a forward error correction ("FEC") coding to the channel coding element partitions based in part on the channel coding rate allocation.

Some implementations of the method and apparatuses described herein include a memory and a processor coupled to the memory that is configured to cause the apparatus to receive a configuration comprising a video codec profile used to encode a video coded stream, receive a FEC transmission of the video coded stream comprising PHY transport elements and subsequent channel coding element partitions corresponding to a video coded traffic aware PHY transport, receive a channel coding rate allocation of the channel coding element partitions based on the video coded traffic aware PHY transport, receive an indication of the video coded traffic aware PHY transport corresponding to an alignment of video coded network abstraction layer ("NAL") units of the video coded traffic stream to the PHY transport elements and channel coding element partitions, apply the FEC transmission of the video coded stream, the received channel coding rate allocation, and the indication of the video coded traffic aware PHY transport to perform channel decoding of the video coded stream to retrieve the corresponding PDU set corresponding to the NAL unit of video coded data, and use the configuration comprising the video codec profile to decode the video coded stream.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
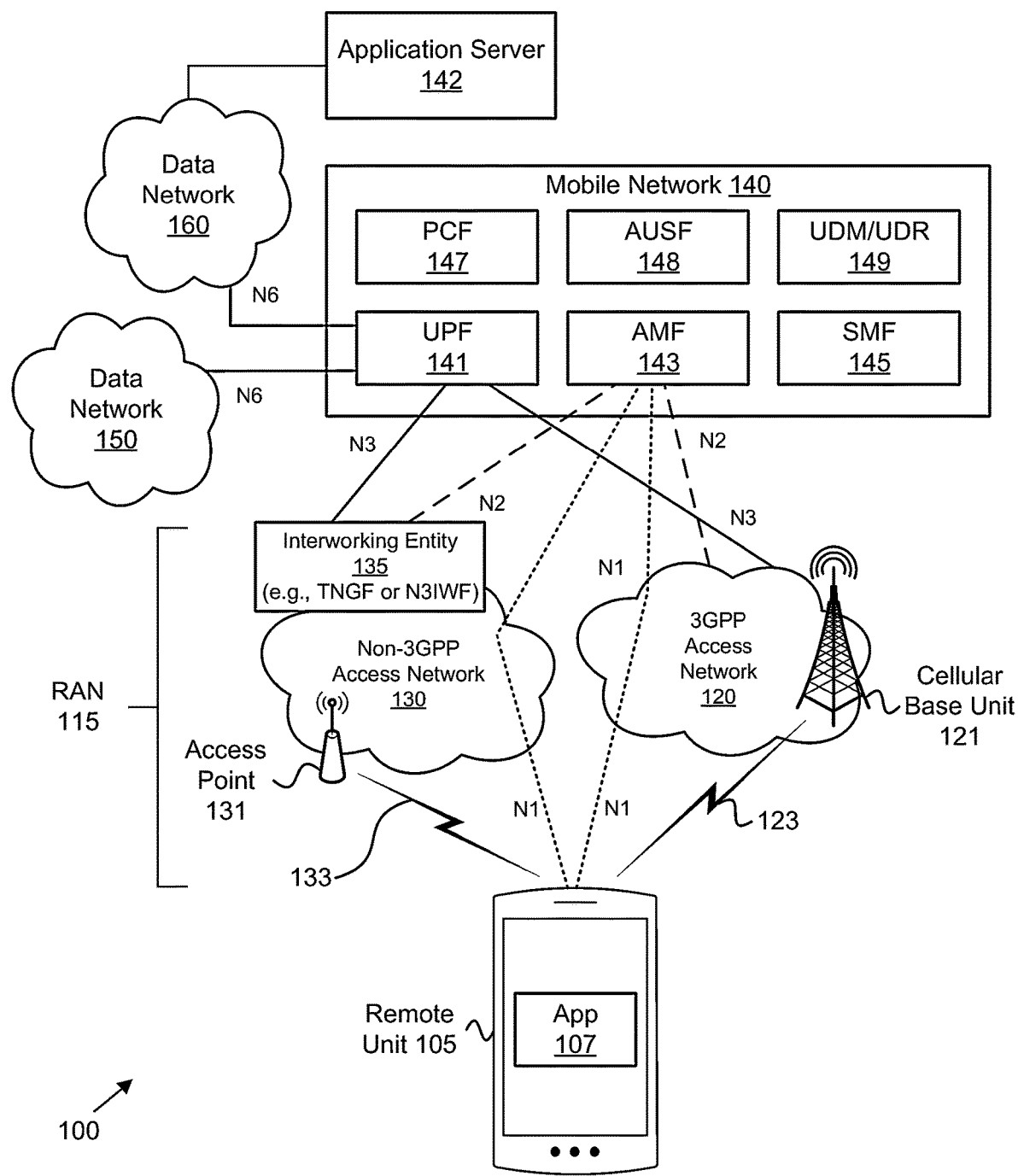
FIG. 1 is a schematic block diagram illustrating one embodiment of a wireless communication system for video codec aware RAN configuration and unequal error protection coding.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof"

includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for video codec aware RAN configuration and unequal error protection coding. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Emerging applications such as augmented reality ("AR")/virtual reality ("VR")/extended reality ("XR"), cloud gaming ("CG"), device remote tele-operation (e.g., vehicle tele-operation, robot arms tele-operation etc.), 3D video conferencing, smart remote education, or the like are expected to drive increase in video traffic. Even though the foregoing applications may require different quantitative constraints and configurations in terms of rate, reliability, latency, and quality of service ("QoS"), it is expected that such constraint sets will challenge current and future communications networks in delivering a high-fidelity quality of experience ("QoE") at ever increasing resolutions. As the quality of rendering end devices will increase and their costs will decrease with time, such applications are expected to steadily expand and furthermore also increase the bar on the QoE of end applications. As such it is of high interest to provide scalable and reliable solutions from a communications network perspective for the next generation media content delivery systems and their immersive digital reality applications.

Communications networks are one critical component of such applications. Another key technology in scaling the deployment of these immersive media experiences is the video encoding and compression of the source video information. This is critical in reducing the size of raw picture data to a point where communications systems can reliably transmit the video content over various challenging network conditions associated with mobile and wireless data systems and applications. Currently, the communications plane is completely separated from the video source encoding plane which makes the optimization of transmission strategies for reliable QoE of such video intensive applications difficult and/or limited. Despite current advances in video codec development (e.g., H.266 standard release), the data increase rates of high resolution multiview/AR/XR/3D applications exceed the compression gains. As such, it is of interest to develop mechanisms to aid the communications and access networks to understand codec specific semantics and exploit the latter in designing and configuring optimized transmission strategies for the mentioned video applications.

In one embodiment, this disclosure proposes a method to adaptively configure, align, and unequal error protection ("UEP") FEC code RAN PHY transport blocks ("TBs") and partitions thereof based on video coded data awareness, including a segmentation of TBs into variable length partitions as mini-TBs and video codec-aware alignment to codec data units (e.g., slices, parameter sets, and/or the like); an UEP configuration via hybrid automatic repeat request incremental redundancy ("HARQ-IR") at the mini-TB level as well as UEP configuration via various coding rate mini-TBs for first time transmissions for segmentation of transport blocks; a configuration of variable length/coding rate of TB partitions based on the importance of the video coded transported data; and associated signaling mechanisms to configure the RAN PHY coding based on video coded ADUs/NAL units data awareness.

FIG. 1 depicts a wireless communication system 100 for video codec aware RAN configuration and unequal error protection coding, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a Third Generation Partnership Project ("3GPP") access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the 3GPP specifications. For example, the RAN 120 may be a NextGen RAN ("NG-RAN"), implementing New Radio ("NR") Radio Access Technology ("RAT") and/or Long Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. In one embodiment, the remote unites 105 include devices for presenting virtual reality environments, augmented reality environments, and/or extended reality environments, e.g., head-mounted display units.

Moreover, the remote units 105 may be referred to as User Equipment ("UE") devices, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (e.g., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or Packet Data Network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more QoS Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, e.g., a tunnel between the remote unit 105 and a Packet Gateway ("P-GW"), not shown, in an Evolved Packet Core Network ("EPC"). In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with a first mobile core network, an EPC (not shown), to establish a second data connection (e.g., part of a second PDU session) with a second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a device, or by any other terminology used in the art. The cellular base units 121 are generally part of a RAN, such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (e.g., shared) radio spectrum.

The non-3GPP access networks 130 may be distributed over a geographic region. Each non-3GPP access network 130 may serve a number of remote units 105 within a serving area. An access point 131 in a non-3GPP access network 130 may communicate directly with one or more remote units 105 by receiving UL communication signals and transmitting DL communication signals to serve the remote units 105 in the time, frequency, and/or spatial domain Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the Access and Mobility Management Function ("AMF") 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or an EPC, which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an AMF 143 that serves the 5G-RAN 115, a Session Management Function ("SMF") 145, a Policy Control Function ("PCF") 147, an Authentication Server Function ("AUSF") 148, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (e.g., session establishment, modification, release), remote unit (e.g., UE) IP address allocation & management, DL data notification, and traffic steering configuration for UPF for proper traffic routing.

The PCF 147 is responsible for unified policy framework, providing policy rules to Control Plane ("CP") functions, access subscription information for policy decisions in UDR. The AUSF 148 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more Application Programming Interfaces ("APIs")), a Network Repository Function ("NRF") (which provides NF service registration and discovery, enabling NFs to identify appropriate services in one another and communicate with each other over APIs), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single Network Slice Selection Assistance Information ("S-NSSAI"), while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

In one embodiment, the network 100 includes an application server 142 that hosts applications for use by the mobile network 140, the RAN 115, the remote unit 105, and/or the like. As it relates to the subject matter disclosed herein, the application server 142 may host a video codec-aware application that is used to determine and indicate an importance of an underlying NAL unit of video coded elementary stream. The importance indicator may also be placed within the mobile network 140 (e.g., at the UPF 141), the RAN 115 (e.g., at the upper layers), and/or the like.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as a Mobility Management Entity ("MME"), Serving Gateway ("S-GW"), P-GW, Home Subscriber Server ("HSS"), and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfox, and the like. For example, in an 4G/LTE variant involving an EPC, the AMF 143 may be mapped to an MME, the SMF mapped to a control plane portion of a P-GW and/or to an MME, the UPF 141 may be mapped to an S-GW and a user plane portion of the P-GW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, a common setup adopted at the 3GPP level, e.g., 3GPP Technical Report TR 26.928 (v16.0.0—November 2020). 5G; Extended Reality (XR) in 5G; S4-211210: [FS_XRTraffic]: Permanent document, v0.8.0, Rapporteur Qualcomm Inc., (2021), for immersive XR and high-performance video content transmissions relies on the concept of split rendering. This uses an application server located at the edge and connected to a core network ("CN"), which is used to encode the application video content and transfer it to a RAN for mobile communications. In exchange, the RAN communicates with a connected UE, which may use additional hardware/software processing to render the video content to match a user's pose/inputs/control state. This architectural approach is displayed for reference in FIG. 2.

Figure 2:
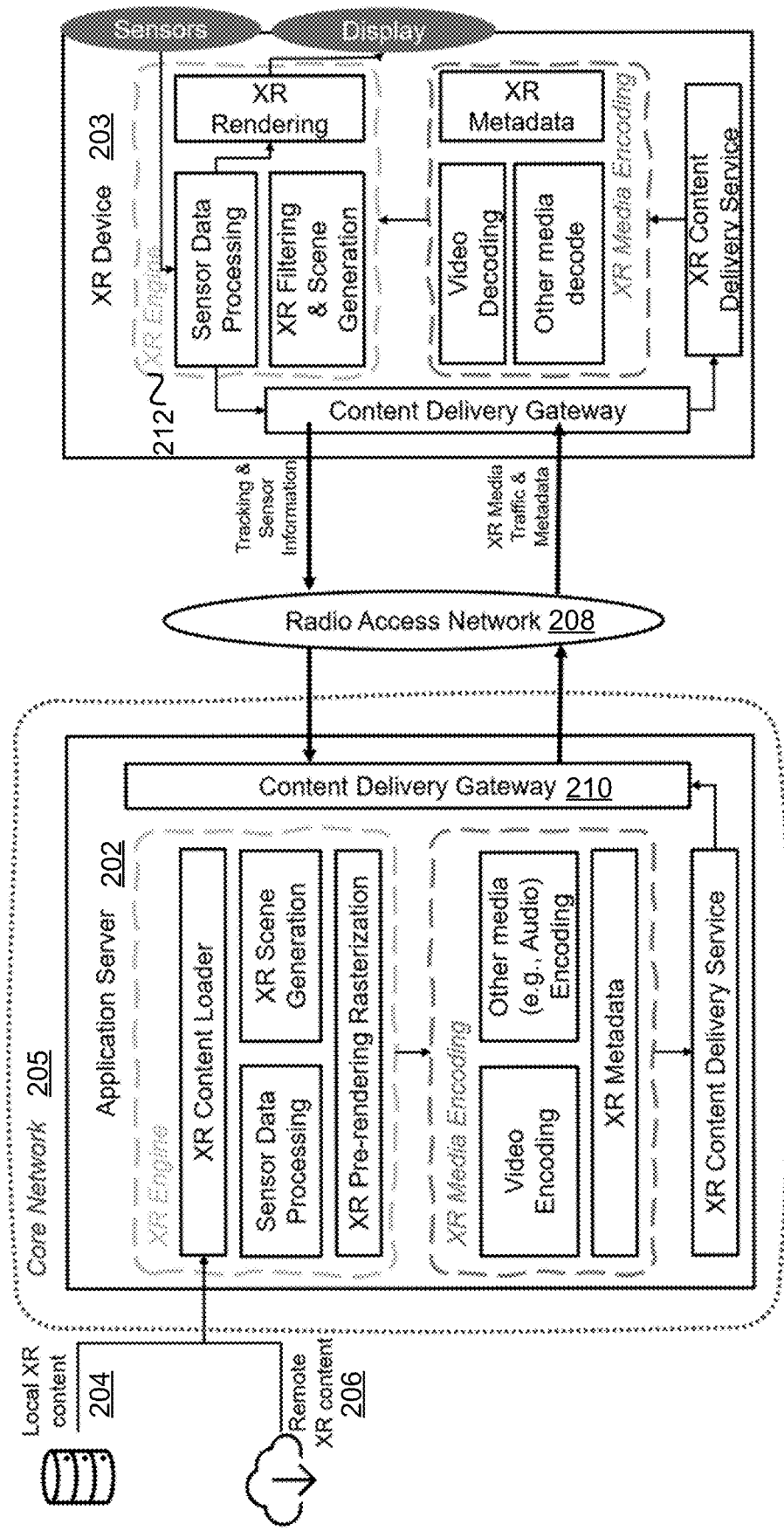
FIG. 2 depicts an embodiment of a split-rendering architecture for mobile networks based on an edge/cloud video application server and an XR UE device.

FIG. 2 depicts a split-rendering architecture for mobile networks based on an edge/cloud video application server and an XR UE device 203. The device 203 is connected to a radio access network 208, which is in turn connected to the application server 202 via a core network 205. The application server 202 may deliver XR media based on local XR processed content or on remote XR processed content. The processing may account for and/or further process tracking and sensing information as uplinked by the XR UE device 203. The application server 202 streams the XR multimedia content via a content delivery gateway 210 to which the XR UE device 203 is connected via any real-time transport protocol. The XR device 203, after decoding the XR content received from the application server 202, may use its XR engine 212 and additional local hardware/software capabilities and/or XR pre-rendered content, and XR associated XR metadata to locally render the XR content on a display.

In the depicted embodiment, the video application server 202 is used therefore to process, encode, transcode, and/or serve local 204 or remote 206 video content pertaining to an AR/XR/CG/tele-operation application session to the XR UE 203. The video application server 202 may, as a result, encode/transcode and control the video viewport content and transmit it in downlink to the RAN 208 based on UE specific parameters, configurations and sensing inputs that may affect the rendering perspective, rate, quality, panning, etc. This general architecture is expected to leverage the advantages of various compute and network domains (e.g., cloud, edge, smart handsets/headsets) to enable scalable AR/XR/CG/tele-operation applications and use cases with low-latency, high rate, and efficient energy usage. The architecture is as such universally applicable both to split rendering with asynchronous time warping devices, e.g., where the video application server encodes a rasterized pre-processed viewport representation to aid the UE, or to split rendering with viewport rendering at the device side, e.g., where the video viewport may be completely or partially rendered at the device side given the media encoded video content and its corresponding metadata available.

In one embodiment, related to video coding domain, the interactivity involving these applications requires guarantees in terms of meeting packet error rate ("PER") and packet delay budget ("PDB") for the QoE of rendering the associated video streams at a UE. The video source jitter and wireless channel stochastic characteristics of mobile communications systems make the former challenging to meet especially for high-rate specific digital video transmissions, e.g., 4K, 3D video, 2×2K eye-buffered video, and/or the like.

In one embodiment, current video source information is encoded based on 2D representations of video content. The encoded elementary stream video content is generally, regardless of the source encoder, organized into two abstraction layers meant to separate the storage and video coding domains, e.g., the NAL, and the video coding layer ("VCL"), respectively. The NAL syntax encapsulates the VCL information and provides abstract containerization mechanisms for in-transit coded streams, e.g., for disk storage/caching/transmission and/or parsing/decoding.

The VCL, on the other hand, encapsulates the video coding procedures of an encoder and compresses the source encoded video information based on some entropy coding method, e.g., context-adaptive binary arithmetic encoding ("CABAC"), context-adaptive variable-length coding ("CAVLC"), and/or the like. A simplified description of the VCL procedures to generically encode video content is as follows: a picture 302 in a video sequence is partitioned 304 into coding units (e.g., macroblocks, coding tree units or variations thereof) of a configured size. The coding units may be subsequently split under some tree partitioning structures (see ITU-T Series H: Audiovisual and Multimedia Systems: Infrastructure of Audiovisual Services—Coding of Moving video. Advanced Video Coding for Generic Audiovisual Services (H.264) (v08/2021); ITU-T Series H: Audiovisual and Multimedia Systems: Infrastructure of Audiovisual Services—Coding of Moving video. High Efficiency Video Coding (H.265) (v08/2021); ITU-T Series H: Audiovisual and Multimedia Systems: Infrastructure of Audiovisual Services—Coding of Moving video. Versatile Video Coding (H.266) (v08/2020)), e.g., binary/ternary/quaternary trees, or under some predetermined geometrically motivated 2D segmentation patterns (see de Rivaz, P., & Haughton, J. (2018). AV1 Bitstream & Decoding Process Specification. The Alliance for Open Media, 182, available at https://aomediacodec.github.io/av1-spec/av1-spec.pdf), e.g., the 10-way split.

In one embodiment, encoders use visual references among such coding units to encode picture content in a differential manner based on residuals. The residuals are determined given the prediction modes associated with the reconstruction of information. Two modes of prediction are universally available as intra-prediction 306 (shortly referred to as intra as well) or inter-prediction 308 (or inter in short form). The intra mode is based on deriving and predicting residuals based on other coding units' contents within the current picture, e.g., by computing residuals of current coding units given their adjacent coding units coded content. The inter mode is based, on the other hand, on deriving and predicting residuals based on coding units' contents from other pictures, e.g., by computing residuals of current coding units given their adjacent coded pictures content.

The residuals are then further transformed for compression using some multi-dimensional (2D/3D) spatial multi-modal transform 310, e.g., frequency-based, or wavelet-based linear transform, to extract the most prominent frequency components of the coding units' residuals. The insignificant high-frequency contributions of residuals are dropped, and the floating-point transformed representation of remaining residuals is further quantized 312 based on some parametric quantization procedure down to a selected number of bits per sample, e.g., 8/10/12 bits. Lastly, the transformed and quantized residuals and their associated motion vectors to their prediction references either in intra or inter mode are encoded using an entropy encoding mechanism to compress the information based on the stochastic distribution of the source bit content. The output of this operation is a bitstream 316 of the coded residual content of the VCL. A simplified generic diagram of the blocks of a modern hybrid (applying both temporal and spatial compression via intra-/inter-prediction) video codec is displayed in FIG. 3.

Figure 3:
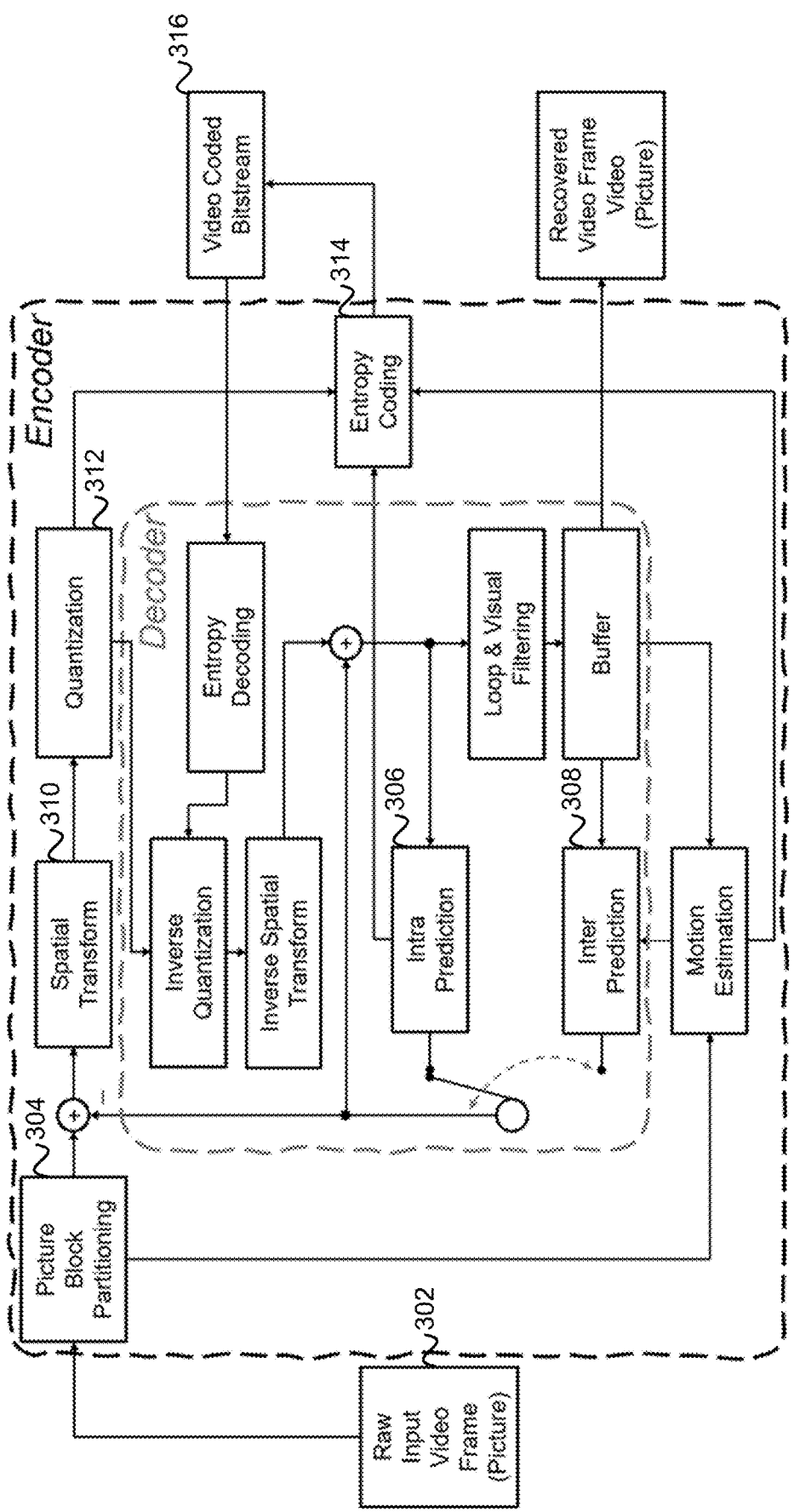
FIG. 3 depicts an embodiment of a simplified block diagram of a generic video codec performing both spatial and temporal (motion) compression of a video source.

FIG. 3 depicts a generic video codec performing both spatial and temporal (motion) compression of a video source. The encoder blocks are captured within the "Encoder" tagged domain. The decoder blocks are captured within the "Decoder" tagged light gray domain. One skilled in the art may associate the generic diagram from above describing a hybrid codec with a plethora of state-of-the-art video codecs, such as, but not limited to, MPEG-1, MPEG-2, MPEG-4 (generically referred to as MPEG-x), H.264, H.265, H.266 (generically referred to as H.26x) or VP8/VP9/AV1. As such, the concepts hereby utilized shall be considered in a general sense, unless otherwise specifically clarified and reduced in scope to some codec embodiment hereafter.

The coded residual bitstream is then encapsulated into an elementary stream as NAL units ready for storage or transmission over a network. The NAL units are the main syntax elements of a video codec and these may encapsulate encoded video metadata, e.g., video/sequence/picture parameter set ("VPS"/"SPS"/"PPS"), supplemental enhancement information ("SEI") messages etc., and encoded video headers and residuals data, generically as picture slices (partitions of a picture, or equivalently, of a video frame). The encapsulation general syntax carries information described by codec specific semantics meant to determine the usage of metadata and video encoded data and aid the decoding process.

The NAL units' encapsulation syntax is composed of a header portion determining the beginning of a NAL unit and the type thereof, and a raw byte payload sequence containing the NAL unit relevant information. The NAL unit payload may subsequently be formed of a payload syntax or a payload specific header and an associated payload specific syntax. A critical subset of NAL units is formed of parameter sets, e.g., VPS, SPS, PPS, SEI messages and configuration NAL units (also known generically as non-VCL NAL units), and picture slice NAL units containing video encoded data as VCL information. An effective decoder may:
  implement a bitstream parser extracting the necessary metadata information and VCL associated metadata from the NAL unit sequence;
  decode the VCL residual coded data sequence to its transformed and quantized values;
  apply the inverse linear transform and recover the residual significant content;
  perform intra or inter prediction to reconstruct each coding unit luminance and chromatic representation;

apply additional filtering and error concealment procedures; and reproduce the raw picture sequence representation as video playback.

These operations and procedures may happen successively, as listed, or out-of-order depending on a decoder specific implementation.

picture to their lowest importance given common video codec specifications, as highlighted briefly in Table 1.

Consequently, if a slice contains both intra- and inter-coded coding units, it will be down-prioritized from an importance perspective even though it may contain a higher significant portion of intra-coded components which are more relevant than the inter-coded ones.

TABLE 1

Slice type and generic characterization with respect to intra-/inter-prediction type according to common video codecs

| Slice type | Meaning and content | Generic importance | Rate-distortion behavior |
|---|---|---|---|
| I-Slice | May contain only intra-coded coding units | High | High rate, loss severely distorts current picture and video coded sequence set referencing this slice |
| P-Slice | May contain only intra-coded and predictive inter-coded coding units | Medium | Low-medium rate, loss may distort to some degree the current picture and may affect video coded sequence set referencing this slice |
| B-Slice | May contain intra coded and predictive/bi-predictive inter-coded coding units | Low | Low rate, loss might distort the current picture and might affect video coded sequence set referencing this slice |

Current RAN implementations do not consider any knowledge of the application data payloads they are required to serve. This level of intelligence may, however, be necessary in handling AR/XR/CG/tele-operation traffic involving multiple streams that may require different QoS flows with heterogeneous yet almost deterministic rate, latency, and reliability requirements for a satisfactory QoE delivery. Discussions regarding a video-codec and application awareness at the level of (fifth generation) 5G RAN have been triggered (see S4-211210: [FS_XRTraffic]: Permanent document, v0.8.0, Rapporteur Qualcomm Inc., (2021)) where the Group of Pictures ("GoP") and prediction types (e.g., intra-/inter-prediction) are currently considered as main features to determine the relevance of a video coded slice (as a partition of a picture/frame) at the RAN level. By definition, a GoP represents a temporal sequence of video frames starting (or ending) with an intra-coded video frame (an I-frame) followed by plurality of forward predicted frames (P-frames) or bi-directional predicted frames (B-frames). A group of pictures parameter set is further described by its associated VPS NAL unit (containing video layer attributes characterization and encoder configuration), SPS NAL unit (containing sequence-level attributes characterization and encoder configuration), and PPS NAL unit (containing picture-level attributes characterization and encoder configuration).

Concretely, the GoP-oriented importance of a slice as a video frame partition is based on whether the slice contains elements that are intra-coded (an I-slice) or are inter-coded (a P-slice for slices with some inter-coded coding units referencing prior references, or a B-slice for slices with inter-coded coding units bi-directionally referencing prior and posterior references within the video sequence), and on the offset to the last intra-coded picture within the current GoP given a periodic GoP encoding configuration. As such, if the slice is an I-slice and belongs to the current intra-coded picture it is of highest importance, whereas the importance decreases linearly to 1 as the slice may be a P/B-slice and belongs to an inter-coded picture further away from the last intra-coded picture. This mechanism may overly simplify some aspects of video coding and visual perception by equally weighting coding units and subsequent regions of a In one embodiment, related to layer-based streaming and dynamic control, as video codecs are designed to compress the video information source under a rate-distortion trade-off constraint, their encoding is not specifically targeted for lossy mobile wireless communications, which affect the encoded bits transfer at random given the characteristics of the wireless channel. Often dynamic adaptation of video source encoding based on channel statistics involves high feedback loop delays given the multiple network hops separating the video source and RAN, or equivalently, a video decoder at a receiver. Scalable enhancements of video codecs (at the expense of increased encode/decode complexity) is achieved by layered encoding with spatial and/or temporal video coding layers.

As a result, the encoded video content may be incrementally encoded/transmitted/decoded given some hierarchical relationship between the video layers (e.g., a base video layer, an enhancement layer #1, an enhancement layer #2 etc.). Such encoding/decoding procedures have been developed either as extensions of existent codec families, e.g., H.264, or otherwise in-built in new generation codecs such as H.265, H.266. This scalable layered approach together with the bandwidth ("BW") occupied by each individual layer offer the possibility of dynamic streaming adaptation of a video source rate outside of the video encoder domain, applicable in practice.

Regarding 3GPP RAN overview and E2E XR (Video) transport architecture, in 5G NR RAN, as well as in previous releases of 3GPP, the RAN lower layers have no specific knowledge of the upper layer traffic, acting as a Data Radio Bearer ("DRB") over the physical wireless channels between a CN/data network and a UE. As such, no optimized decision can be taken in appropriately scheduling associated traffic and controlling the rates of various application streams for transmissions with high granularity and low-delay adaptability constraints required by highly mobile environments.

Interactive multimedia applications such as AR/VR/XR involving high-rate and low-latency constraints for transmission of video coded data synchronized to some user interaction is such a specific use case with a high QoE requirement. To serve alike applications reliably and robustly, a RAN may benefit from metadata and actionable insights into the AR/VR/XR video traffic required to transfer over the air.

Figure 4:
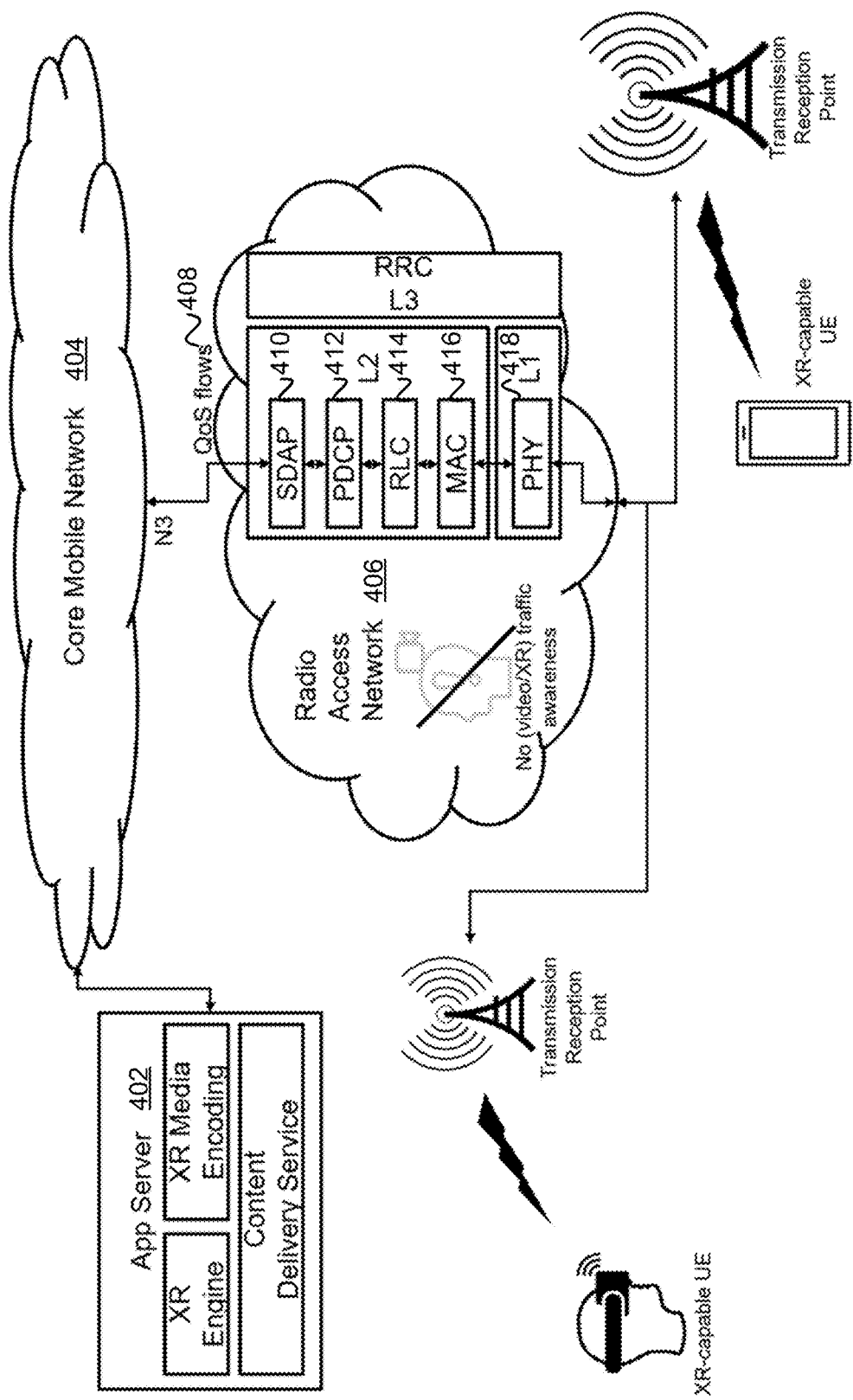
FIG. 4 depicts one embodiment of a communications systems architecture overview.

Certain embodiments, however, do not offer such capabilities and procedures. As illustrated in FIG. 4, the PDUs associated with an XR application session of an application server 402 connected to a CN 404 is transferred via the CN 404 UPF over the Internet Protocol ("IP") to the RAN 406. The multimedia traffic may be further supported by a real-time multimedia transport protocol such as a Real-time Transport Protocol ("RTP") or alike to handle jitter, packet loss and out-of-order deliveries that may occur within a typical IP network setup.

The QoS associated with IP packets of the XR traffic is handled by the CN 404 via QoS flows 408 generated at the UPF within the established PDU session. This procedure is opaque to the RAN 406, which only manages the mapping of QoS flows 408 associated with the received IP packets to their corresponding DRBs given the QoS profile associated with the indicators of each QoS flow 408. In a 5GS for instance the QoS flows 408 will be characterized by the 5QI (see 3GPP Technical Specification TS 23.501 (V17.2.0—September 2021). System architecture for the 5G System (5GS); Stage 2 (Release 17)).

This latter mapping of QoS flows 408 to DRBs is performed within the RAN 406 by the Service Data Adaptation Protocol ("SDAP") layer 410. The SDAP Service Data Unit ("SDU") is then processed by the Packet Data Convergence Protocol ("PDCP") 412 where among others header compression and ciphering are performed and the outputs further processed by the Radio Link Control ("RLC") 414. The RLC 414 may perform segmentation of the PDCP 412 SDUs and implements the automatic request response ("ARP") repetition retransmissions. The RLC 414 SDUs are then processed over the logical channels interfaces by the Medium Access Control ("MAC") layer 416, which handles the logical channels multiplexing, hybrid automatic repeat request ("HARQ"), scheduling and scheduling retransmission functions. Lastly, the MAC SDUs are combined over the transport channel into TBs at the level of PHY layer 418. The PHY handles the coding/decoding, rate matching, modulation/demodulation, radio resource mapping, multi-antenna mapping and other typical radio low-layer functions.

The PHY TBs, which are appended with their own Cyclic Redundancy Check ("CRC") of 16 or 24 bits blocks for detection of errors, are further partitioned into same-sized coding blocks ("CBs"). The CBs are appended as well by 24 bits CRC for error detection and following this operation they are FEC encoded by the PHY. The HARQ procedure within 5G NR ensures incremental redundancy retransmissions of an entire TB in case any of the CBs or TB CRC checks fail thus effectively ensuring reliability over the wireless link. In addition, given the increasing size of TBs, 5G NR also introduced a code block group ("CBG") construct to group one or more CBs into CBGs. The CBGs, if configured appropriately via the Radio Resource Control ("RRC"), support independent HARQ via Downlink Control Information ("DCI") signaling primarily via CBG Transmit Indicator ("CBGTI") and CBG Flush Indicator ("CBGFI") within the same HARQ process as the enclosing TB. As such, some mechanisms for versatile retransmissions are present in 5G NR to reduce retransmissions delays and resource utilization, yet the underlying blocks enabling the latter are semi-statically assigned at best and in fact fixed in size, which makes the dynamic alignment and awareness adaption to video coded traffic difficult.

Consequently, any dynamic adaptation required at the RAN level to satisfy QoS flow requirements is constrained just to meeting a hard threshold in terms of statistical PER, PDB, or guaranteed bit rate ("GBR") without any prior information of the content/importance of data transmitted. As already outlined, for multimedia video traffic not all packets/data segments (e.g., video frames/slices) are of equal importance, and even not all bits are equal in achieving a satisfactory level of QoE for an end user. For a reliable, robust, and user-oriented immersive video experience, it would therefore be of interest for the RAN lower layers transmission strategies to leverage the knowledge of the importance of video encoded data segments that must be transmitted and adapt the forward error correction wireless channel coding and retransmissions configuration to protect adequately the transmitted information.

In general, the subject matter herein presents solutions for video coded traffic and importance awareness at RAN level for PHY layer configuration of transport blocks. As such, a method for the RAN transport block configuration, including the alignment and the mapping of the video coded data units to coding blocks and coding block groups of variable sizes, and respectively, the dynamic coding rate allocation of coding block and coding block groups given the importance of the video coded data units are provided as part of two embodiment sets.

Figure 5:
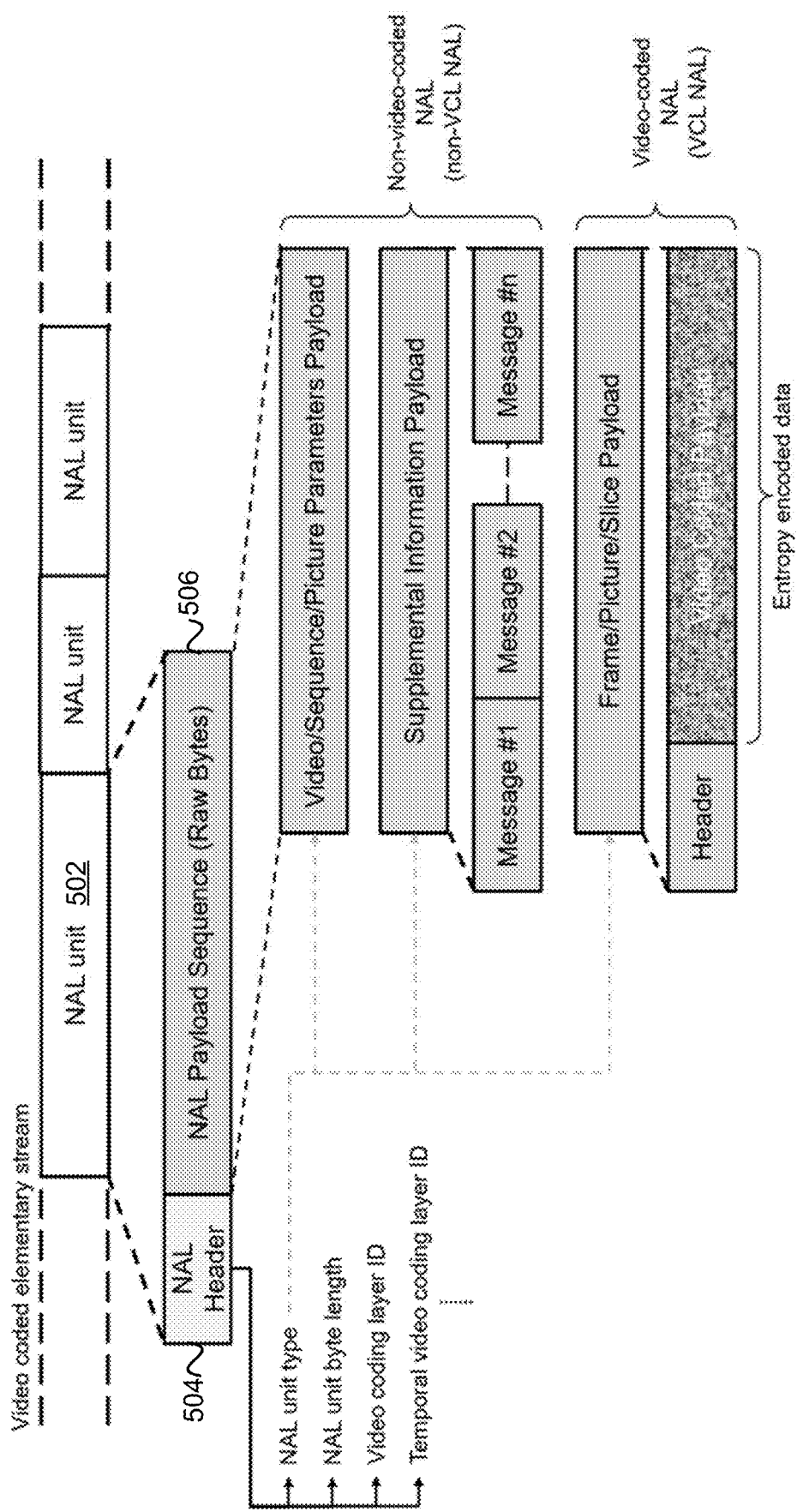
FIG. 5 depicts an embodiment of a video coded elementary stream and its partitioning in a plurality of NAL units.

In one embodiment, encoded video content is encapsulated, e.g., according to H.26x standards, into a storage/transport abstraction layer, e.g., the NAL. The NAL partitions an elementary video stream into NAL units 502 as fundamental units of storage of the video encoded content that are either to be stored to a disk or transmitted over a packet-based network. A NAL unit 502 is further partitioned into a header portion 504 as NAL prefix and a NAL payload 506 containing raw uncoded (VPS/SPS/PPS/SEI) or coded (video slice/slice segments) byte information. The NAL unit header 504 is formed of a delimiter to identify the NAL unit start position, as well as information about the contents of the NAL unit payload, e.g., NAL unit type, NAL byte length, video coding layer/temporal layer identifier, as highlighted in FIG. 5, which depicts a video coded elementary stream and its partitioning in a plurality of NAL units. The NAL units are formed of a header and a payload, containing information about the type, size, and video coding attributes and parameters of the NAL unit data enclosed information.

More information about the NAL unit content may be gathered based on the NAL unit type by parsing the NAL unit payload 506 and by interpreting specific semantics of payload headers 504 and non-entropy video encoded data. This procedure can be performed in real-time with linear complexity and low latency overhead over specialized hardware embodiments or software implementations. Extracting this information, a feature set of attributes semantically describing a NAL unit 502 from the perspective of the video codec may be formed to categorize/estimate/infer/predict the importance of NAL units 502 for the coded video elementary stream playback. This procedure of categorization/estimation/inference/prediction may be performed at various instances of the end-to-end transmission chain prior to the RAN scheduling and transmission configuration functionality as it acts as a video coded NAL data importance indicator.

As in typical real-time transport protocols over packet-switched networks, e.g., RTP/User Datagram Protocol ("UDP")/IP, an ADU, an application's/stream's smallest independently usable data unit, is represented by one of a NAL unit 502, a NAL unit data fragment (in case NAL unit exceeds RTP payload max size provided a maximum transmission unit ("MTU") and is fragmented across multiple RTP payloads) or multiple NAL units 502 (whereas for the two latter cases hint sample signaling for the detection of multiple NAL units is present in the RTP hint track information) (see 3GPP Technical Specification TS 26.244 (v 16.1.0—October 2020). Digital cellular telecommunications system (Phase 2+) (GSM); Universal Mobile Telecommunications System (UMTS); LTE; 5G; Transparent end-to-end packet switched streaming service (PSS); 3GPP file format (3GP) (Release 16)). Thus, in the case of video coded traffic these importance indications with NAL unit granularity are inherently aligned with the ADUs. As such, these importance indications may be further leveraged within the RAN processing domain for radio resources and link control layers to better schedule and transport high-rate, low-latency video encoded traffic associated with immersive AR/VR/XR applications over mobile RANs.

Conventionally, the RAN level does not include any ADU specific knowledge of awareness of the traffic being served, as illustrated in FIG. 4. As such, the RAN configuration, scheduling, and transmissions rely on QoS flows and their mappings to DRBs configurations as signaled by the UPF in the CN. The QoS flows and their associated QoS profile target PER, PDB, or GBR values ensure appropriate configuration of the RAN lower levels, yet this contract between the CN and RAN does not include any finer granularity indicators about the traffic content being enclosed within the QoS flows to aid the RAN meet statistically its contractual agreements at the QoS profile level. This is a problem especially for the high rate, low latency, video encoded XR traffic with noisy periodicity due to inherent source and network jitter since the RAN may require additional knowledge of the data to transfer over the air for better decision making in scheduling and transmissions/retransmissions link control procedures to meet the target PER, PDB and GBR figures.

Figure 6:
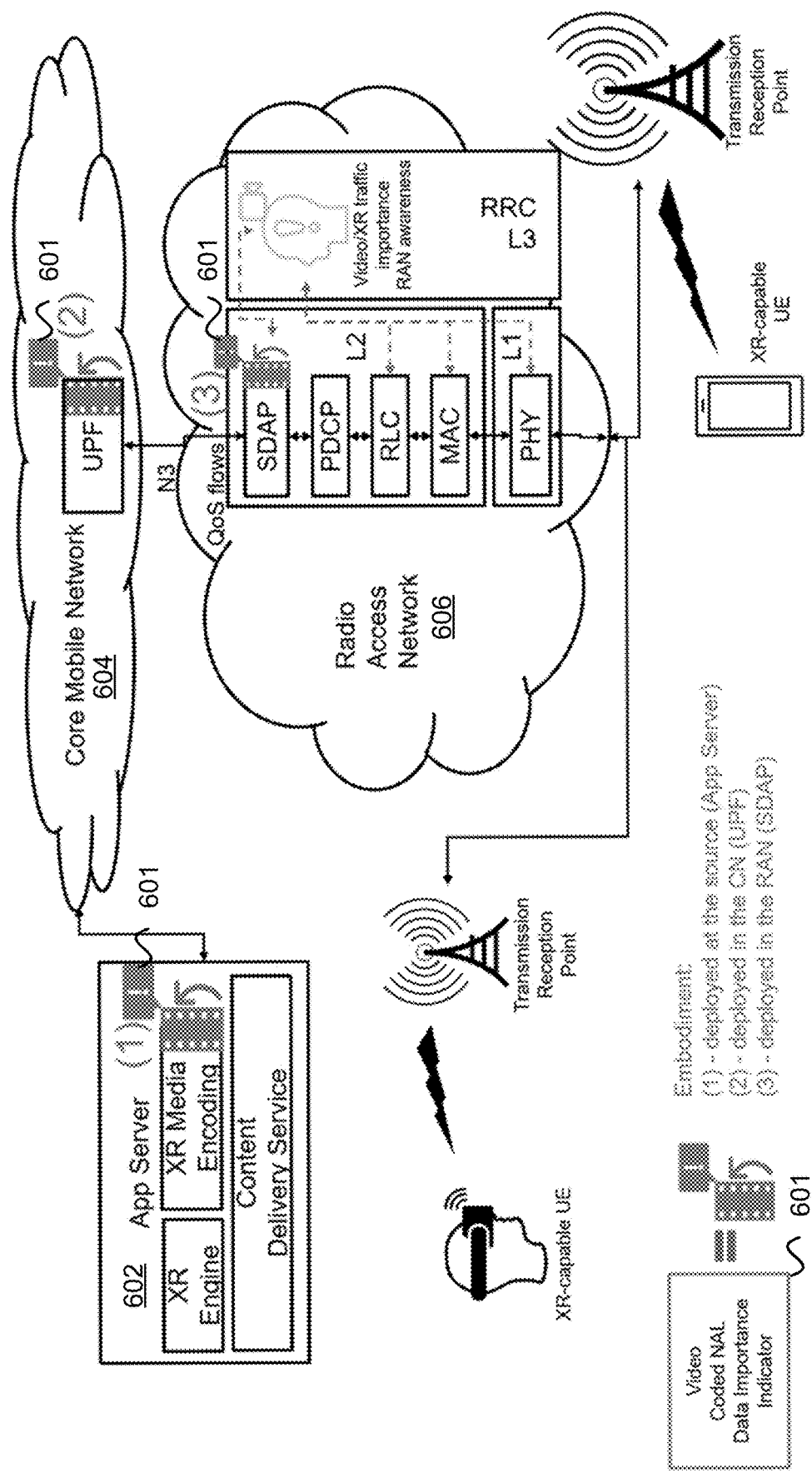
FIG. 6 depicts an embodiment of a video coded NAL data/ADU and associated importance RAN awareness configurations.

This knowledge represents the RAN-awareness to video encoded content and its relevance to the end-user QoE. Equipped with such awareness (such as a video coded per ADU/NAL unit importance indicator), the RAN may decide better how to prioritize traffic, adapt dynamically its configuration, rate, and FEC to reach the target PER, PDB and GBR of associated QoS flows for the video coded traffic packets. A system overview is outlined in FIG. 6 for a high-level RAN-awareness of video coded traffic and its importance in comparison to the conventional systems presented in FIG. 4. As illustrated in FIG. 6, the video coded NAL unit/ADU traffic and importance awareness at RAN 606 is indicated by a video coded NAL data detector and importance indicator 601. Such an indicator filter may be placed at least at one of (1) an application server 602, (2) within a CN UPF 604 or extension thereof, (3) deployed in a RAN 606 upper layers. The NAL data importance indicator 601 is hence used to annotate video coded elementary streams and provide awareness of video coded data content and its importance to a RAN control plane.

An embodiment of the latter RAN awareness of video coded traffic and of its prospective importance may better map the XR video encoded traffic content to RAN TB s and their corresponding FEC coding partitions, e.g., CBs, as well as group similarly important video information within CBGs. This video codec-aware partitioning and grouping of application data to RAN transport blocks may be further leveraged to dynamically adapt the transmission rate at a finer granularity, to provide selective error protection, e.g., UEP, according to video encoded data importance, and respectively, to better handle potential retransmissions in case of bit errors occurred at the receiver end, as detailed in the sequel.

The current lack of RAN awareness of the inherent traffic structure and/or importance being served over the DRBs may cause problems to applications targeting high rates and low latencies over the rapidly varying and potentially congested wireless spectrum. As such, video wireless transmissions generally suffer from NAL units, or equivalently ADUs, to RAN data packets segmentation misalignments incurring visual impairments wherever recoverability of original transmitted data cannot be achieved at the receiver end.

A typical example is the case in which a NAL unit containing a slice (in a 1-to-1 frame-to-slice mapping) is segmented over multiple TBs at the PHY transport level and one of the TBs corresponding to the slice header, or equivalently payload, information cannot be recovered (e.g., the retransmissions maximum number or time interval have been exceeded). As an effect, the entire frame associated to the slice is lost and a "frozen" visual effect is generated at playback whilst all the subsequent frames referencing the lost frame are affected by the loss of motion vector references, impairing even further the video playback by video artifacts.

Furthermore, the retransmissions may impact further the throughput and delay of subsequent video data transmissions. Other more complex scenarios would lead to similar visual impairments for the receiver, typical to video coded wireless digital transmissions. As such, similar effects are expected at a higher degree in the case of AR/VR/XR/CG applications with high-rate and low-delays challenging the current capabilities of RAN capacity where no advantage may be taken of the video coded data inherent structure.

Figure 7:
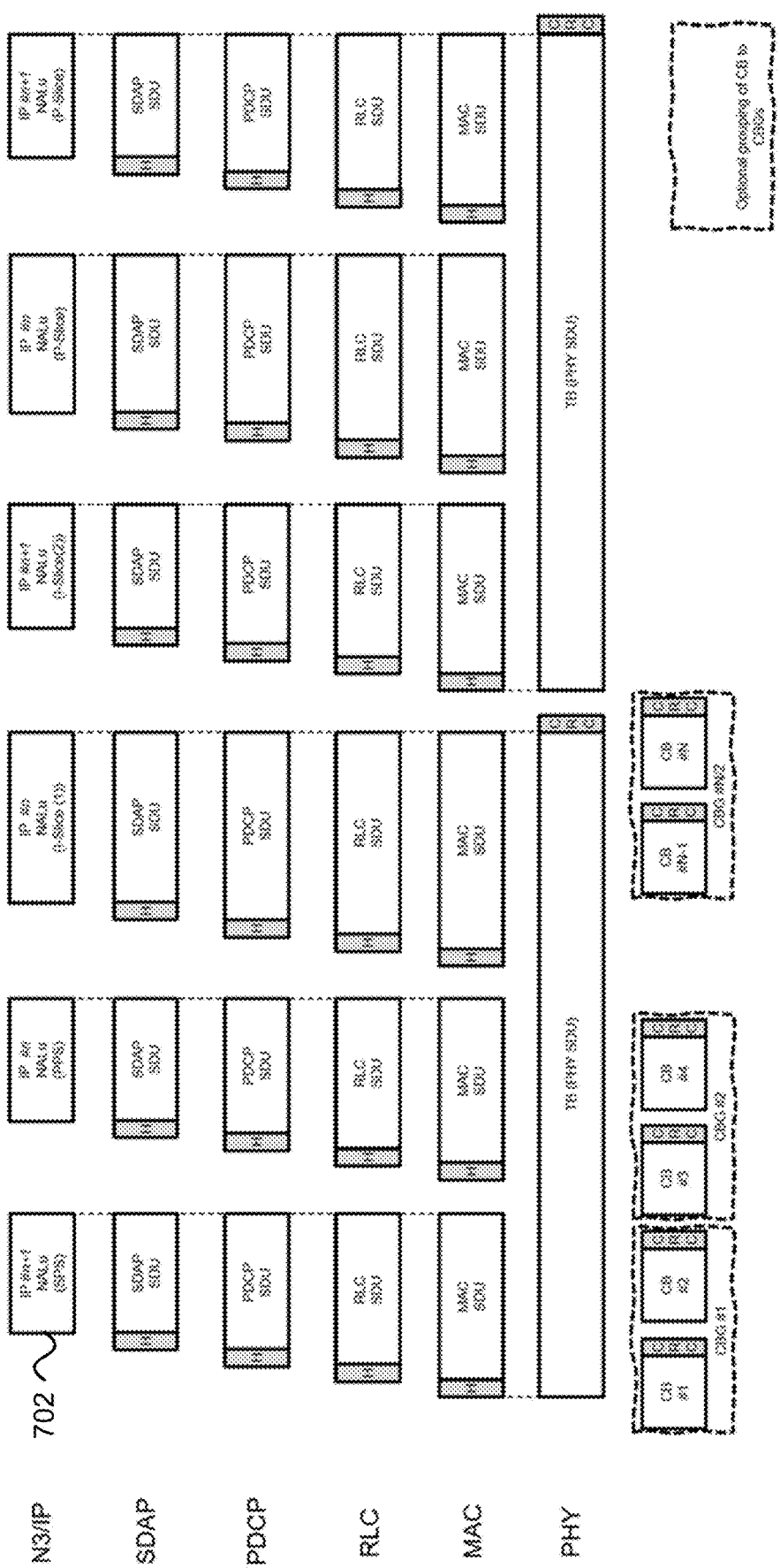
FIG. 7 depicts an embodiment of a packet-oriented schematic of RAN-level processing without traffic content awareness.

However, considering embodiments where the RAN has prior knowledge and is aware of the video coded traffic structure and/or importance at least by one of RAN level video coded data inspection and of higher-level metadata labelling/dedicated importance indications, advantage may be taken of the inherent structure and priority of the video coded data content, and consequently, the video coded data can be better segmented and scheduled/mapped/grouped to RAN TBs and their enclosed FEC CB/CBGs. Such an embodiment provides tailored support for transport of the video coded traffic over the air and provides selective protection mechanisms of the served traffic, reducing the prospective retransmission overheads associated with wrongly received data segments within a TB. FIG. 7 illustrates a RAN without awareness of the video coded data from a cross-layered packet-oriented perspective.

In particular, FIG. 7 depicts a packet-oriented schematic of RAN-level processing without traffic content awareness. In one embodiment, all the IP packets (collectively 702) are treated similarly at the lower levels of the RAN irrespective of the encapsulated ADU payloads. 'H' stands for header.

Basic high-rate, low-delay, and immersive media traffic with video coded data such as for CG/AR/XR applications require consistent data rates around 100 Mbps, whereas more advanced applications, at higher resolutions of spatial dimensions (e.g., 3D renderings), require much higher data rates. Thus, associated TBs at the PHY level tend to be quite large in practice and their retransmissions are expensive in terms of resource utilization and scheduling of subsequent transmissions under constrained resources.

In addition, given practical MTU constraints at the packet size level, the RAN ingested ADU/IP packets may be limited to a fixed MTU (e.g., 1500 bytes for ethernet encapsulation) which enforce some segmentation and fragmentation of the original NAL units data into NAL units data segments. As such, ADUs are encapsulating the latter video coded data as one of a complete NAL unit data, a fragment of NAL unit data (e.g., a NAL unit data segments) or a plurality of NAL unit data segments (out of which a subset thereof may represent complete NAL units data). Hereafter, as a NAL unit is a video codecs smallest independent data unit, we refer to the ADUs as NAL units data, barring reference to the mentioned possibly recoverable (by means of higher layer protocols segmentation/fragmentation/signaling procedures) mappings between the two.

In some embodiments therefore the video coded NAL units data or NAL units data segments (e.g., VPS/SPS/PPS non-VCL NAL units, complete video coded slices VCL NAL units or visually and logically segmented/partitioned parts thereof, e.g., a row/rows of video coding blocks, a plurality of connected video coding units, and/or the like) received over IP packets via some real-time streaming protocol may require alignment with the TBs and/or partitions thereof (e.g., CBGs/CBs in current 5G NR RAN or sets of CBs, namely mini-TBs ("mTBs") in extensions thereof) at the PHY level for better support of radio resource utilization and retransmissions.

An mTB hereafter is referred to a segment of a TB, wherein a plurality of mTBs form a TB. As such an mTB in some embodiments may be formed of at least one of one FEC CB or more FEC CBs, such that the TB segmentation in mTBs is not necessarily required to be equipartitioned in terms of size across all the mTBs, as is currently the case within 3GPP PHY layer with fixed-size (equipartitioning) CBGs. Consequently, an mTB in some embodiments is a video coded traffic aware variable size CBG.

An alignment is generally hereafter the outcome of the procedure of one of:
- encapsulating a NAL unit data (e.g., VPS/PPS/SPS/SEI message/video coded slice) or a sequence of NAL units data (e.g., VPS/PPS/SPS/SEI message/video coded slice) within one CB;
- encapsulating a NAL unit data (e.g., VPS/PPS/SPS/SEI message/video coded slice) or a sequence of NAL units data (e.g., VPS/PPS/SPS/SEI message/video coded slice) within one CBG/mTB; and/or
- encapsulating a sequence of NAL unit data segments (e.g., one of an individual video coded slices, video coded slice segments (e.g., video coded rows or any geometric continuous collection of coded coding block units partitions of the same slice), one or more video coded tiles partitions of a video coded slice) within one CBG/mTB.

As a consequence, in some embodiments, individual NAL units data or NAL units data segments may be sequentially aligned and mapped to CBs and/or grouped as CBGs. The mapping may be used jointly with CBG-based retransmissions to allow for selective retransmissions of only erroneous CBGs and contained NAL data units rather than complete large TB retransmissions thus saving radio resource utilization in contrast to current art of 3GPP RAN procedures.

A plurality of NAL data units or NAL data units segments as received from the upper layers (e.g., MAC SDUs) may be in one embodiment multiplexed within one CB provided that their aggregated size does not exceed the maximum size of the CB given a particular FEC codebook design. The remaining free bits within the CB (if any) may be filled/utilized by one of a known bitfield/bit sequence (e.g., if the number of remaining bits is smaller/not larger than a threshold number of bits) or left for utilization of additional PHY layer signaling procedures (e.g., demodulation reference signal ("DM-RS"), channel state information reference signal ("CSI-RS"), phase tracking reference signal ("PT-RS") etc.). In one embodiment of the latter, the UE is indicated, such as via a DCI scheduling a Physical Downlink Shared Channel ("PDSCH")/Physical Uplink Shared Channel ("PUSCH") or via an Uplink Control Information ("UCI") requesting a PUSCH scheduling/scheduling update, a pattern index which can be used to determine the resource elements ("REs") that have been used for utilization of additional PHY layer signaling procedures.

In an embodiment, a UE is configured with:
- a first maximum number of CBGs per transport block for transmissions/receptions associated with a first attribute (such as traffic-aware scheduling); and
- a second maximum number of CBGs per transport block for transmissions/receptions associated with a second attribute (such as traffic-unaware scheduling)

In an embodiment, a scheduling DCI indicates whether the scheduled transmission is based on traffic-awareness (e.g., as described in this disclosure, wherein the scheduler is aware of certain traffic characteristics of data being scheduled such as ADU/NAL unit boundaries/importance) or not.

In an embodiment, the input bit sequence to the code block segmentation is denoted by $b_0, b_1, b_2, b_3, \ldots, b_{B-1}$, where B>0 ("B" is the number of TB bits). If B is larger than the maximum code block size $K_{cb}$, segmentation of the input bit sequence is performed and an additional CRC sequence of L=24 bits is attached to each code block.

For LDPC base graph 1, the maximum code block size is: $K_{cb}=8448$.

For LDPC base graph 2, the maximum code block size is: $K_{cb}=3840$.

Total number of code blocks C is determined by:

```
If B ≤ K_cb, and all the NAL units mapped to the TB have the same
importance
   L = 0
   Number of code blocks: C = 1
   B' = B
else
   Q = B
   C = 0
   B' = 0
   While Q > 0
      Determine w
      Q = Q - w
      C = C + 1
      B' = B' + w + L1
   endwhile
end if
``` wherein 'w' is determined to be the number of contiguous set of bits from the queue of bits Q that belong to NAL units with the same/similar importance (such as one determined from the schemes of this disclosure) that is not larger than $K_{cb}$-L1, wherein 'L1' is the CRC length for the code block. In an example, L1=24. In another example, L1 is determined based on an indication (such as DCI or MAC-CE) e.g., DCI scheduling the transmission of the input bit sequence.

In an example, if the determined 'w' is smaller than a threshold, the UE checks whether Q-w>0 if so, the UE sets w1=w, and determines a second 'w'>w1 considering w1 bits as part of the second set of 'w' bits.

If a NAL's data unit or a NAL's data unit segment is larger than a CB size then that NAL data unit shall single-handedly fill up the respective CB and subsequent CBs up to its completion (e.g., until no data segments are left from that NAL data unit) and remaining free bits of the last CB are to be filled/utilized by one of a known bitfield/bit sequence or left for utilization of additional PHY layer signaling procedures (e.g., DM-RS, CSI-RS etc.). The next NAL data unit or NAL data unit segment will instead be aligned with the next available CB and allow in some embodiments that the collection of CBs encapsulating a complete NAL data unit are grouped as a CBG. In one embodiment, a field/pattern/bit sequence would indicate respectively whether a NAL data unit/data unit segment is changed for a CB/CBG with respect to a previous CB/CBG. In an example, the DCI scheduling the PDSCH indicates whether for each CBG, the NAL data unit/data unit segment is changed with respect to the previous CBG. In an example, the bit-field length for such an indication is M−1, wherein "M" is the number of CBGs (or the bit-length of CBGTI field in the DCI format for the scheduling DCI).

In an embodiment, if a UE is configured to receive CBG based transmissions by receiving the higher layer parameter codeBlockGroupTransmission for PDSCH, the UE shall determine the number of CBGs for a transport block reception as:

$$M=\min(N,C),$$

where N is the maximum number of CBGs per transport block as configured by maxCodeBlockGroupsPerTransportBlock for PDSCH, and C is the number of code blocks in the transport block (e.g., according to the procedure defined in 3GPP Technical Specification TS 38.212 (v16.5.0—April 2021). 5G; NR; Multiplexing and channel coding, or as determined in above embodiment(s)).

To determine the code blocks that are mapped to CBG m, for m=0, 1, . . . , M−1, the following procedure can be implemented by some embodiments:

```
set m = 0
set q = C − 1
set c = 1
CBG#0 = {code block 0}
while q > 0
    determine whether code block 'c' is associated with the same/similar
NAL unit or has the same/similar importance as that of code block c − 1
    if yes, and the size of CBG#m is not larger than a threshold (e.g., the
size in terms of number of CBs and/or in terms of total bits), CBG#m =
union of (CBG#m, code block c)
    if no
        m = m + 1
        CBG#m = {code block c}
    q = q − 1
    c = c + 1
endwhile
```

In an example, the scheduling DCI or another DCI/MAC control elements ("MAC-CE")/RRC indication, indicates the CB to CBG mapping. For instance, a first mapping is the CBG mapping according to clause 5.1.7.1 of 3GPP Technical Specification TS 38.214 (v16.5.0—April 2021). 5G; NR; Physical layer procedures for data, and a second mapping is according to the CB to CBG mapping as described in this disclosure.

As the size of the CBs is semi-statically fixed (see 3GPP Technical Specification TS 38.212 (v16.5.0—April 2021). 5G; NR; Multiplexing and channel coding) given the overall TB size, namely TBS, determined based on the available radio resources (e.g., transmission layers, resource elements/resource blocks, slot format, MCS etc.) (see 3GPP Technical Specification TS 38.214 (v16.5.0—April 2021). 5G; NR; Physical layer procedures for data), the alignment of variable length NAL data units to CBs and posterior grouping to CBGs may not be a low-complexity task in some embodiments and the spectral efficiency may be impacted. As such, in other embodiments a TB may be completely segmented into variable length CBGs (e.g., as a many-to-one CB to CBG mapping), capable of independent retransmission scheduling within the same HARQ process. Such elements, as defined earlier, are mTBs given their variable length property and variable segmentation of a TB.

As the mTBs are TB partitions of variable length aligned with the NAL data units, their number and size shall be appropriately and dynamically signaled for decoding at the receiver end. This signaling of mTBs sizes may be performed in an embodiment at least by one of a dedicated pattern/bit field within the DM-RS signaling, a DCI scheduling the corresponding PDSCH/PUSCH containing the CBGs/mTBs, a UCI request for scheduling/scheduling update of the corresponding PUSCH containing the CBGs/mTBs, a DCI periodic information signaling aligned with the slot format indicator ("SFI") or a front-loaded signaling encoded with a predetermined low-complexity (e.g., Bose-Chaudhuri-Hocquenghem ("BCH") code, polar code, Golay code etc.) efficient FEC mechanism as part of the enclosing TB of mTBs. In an example, a DCI scheduling the PDSCH/PUSCH contains a bit-field indicating a CBG/CB/mTB size for each CBG/CB/mTB. The length of bit-field can be a multiple of the number of CBGs/CBs/mTBs. For instance, in one embodiment, for each CBG/mTB, the corresponding CBG/mTB size is indicated via 2-bit indication choosing one size out of four possible sizes.

In an embodiment the mTBs minimum size may be limited to a particular threshold $mTB_{min}$ given the FEC design to avoid over-segmentation of data and to still take advantage of long codewords coding gain. In such embodiments, grouping of smaller NAL units data or data segments coming from different NAL units within one mTB is allowed.

Furthermore, in some embodiments the sizes of the CBs forming an mTB spanning an entire NAL unit data or a plurality of NAL unit data segments belonging to a NAL unit data element as described before may be equally partitioned. In such embodiments, the equal splitting of an S-sized mTB into M CBs is determined given the maximum codeword bit size configuration, namely $C_{max}$, of a FEC codebook design used for channel coding the CBs and their corresponding CRCs. In some embodiments M is $$M = \left\lceil \frac{S}{C_{max}} \right\rceil,$$

whereas in other embodiments M is and $$M = \left\lfloor \frac{S}{C_{max}} \right\rfloor,$$

and as such, at least M−1 sequential CBs out of the total M CBs are of equal size. The signaling of such a configuration follows in some embodiments the generic signaling mechanisms for any generic mTB size as detailed in the prequel.

In some embodiments, only VCL NAL units data or data segments thereof (e.g., video coded slices/video coded slice data partitions) may be considered for mapping to CBs/CBGs/mTBs, whereas non-VCL NAL units data or data segments may be treated generically for reduced-complexity implementations. In an example, the DCI scheduling PDSCH/PUSCH containing the CBs/CBGs/mTBs indication of the association of the CBs/CBGs/mTBs to NAL data unit/data unit segment, would indicate a special index (e.g., NAL alignment not applicable) for CBs/CBGs corresponding to non-VCL NAL unit data or data segments.

Figure 8:
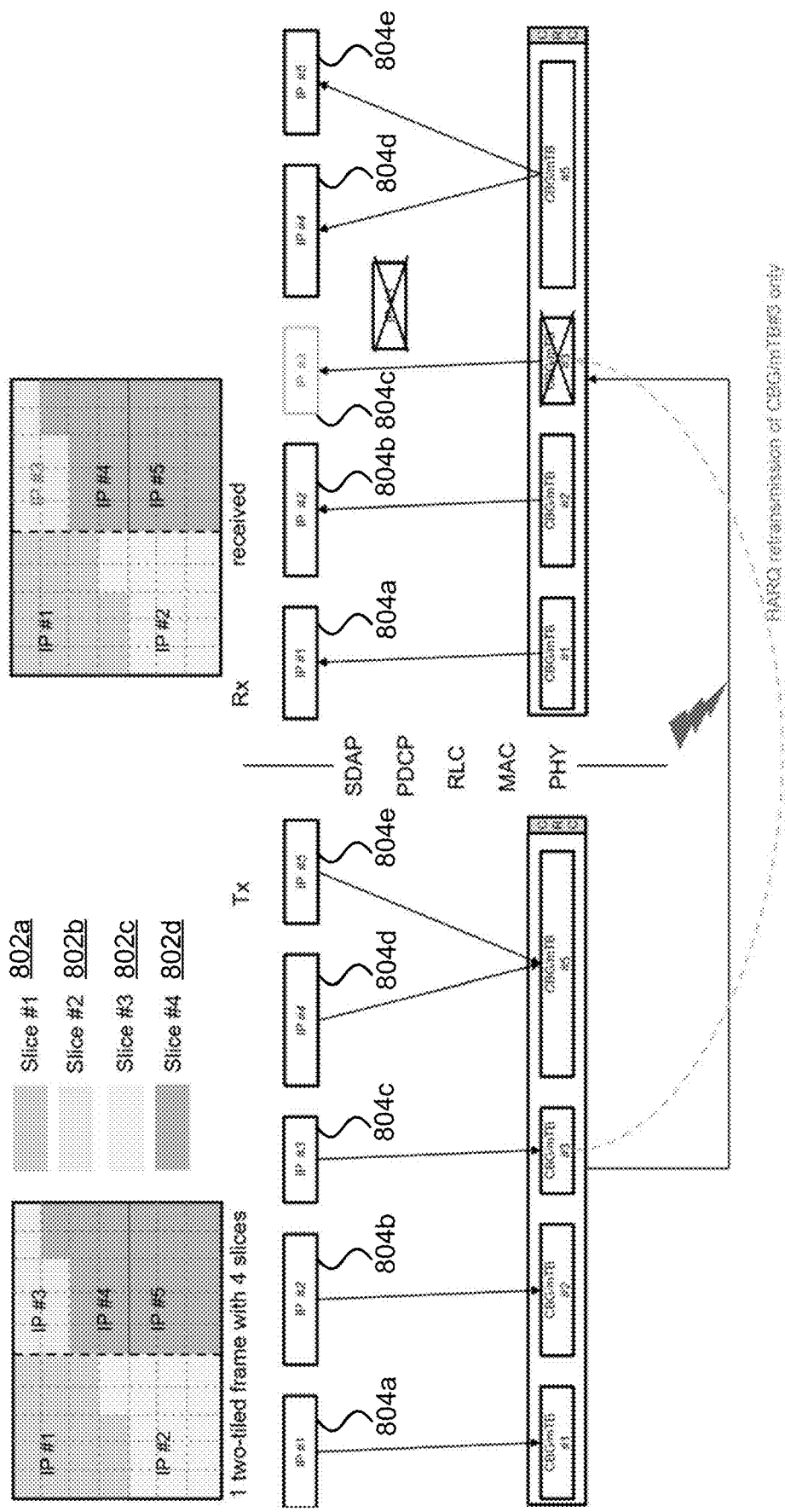
FIG. 8 depicts an embodiment showcasing a mapping of a video frame to PHY transport block variable-length, video codec NAL units-aware coding partitions.

An embodiment representing a mapping of a video frame formed of 4 slices 802a-d onto variable-sized CBGs/mTBs comprised in a TB is depicted in FIG. 8. FIG. 8 depicts an embodiment showcasing a mapping of a video frame to PHY transport block variable-length, video codec NAL units-aware coding partitions. The frame is formed of two tiles sliced into 4 video slices representing 4 NAL units split fragmented by the IP layer to a maximum transport size and sent over the air by a radio network to a receiver.

As can be seen from the figure, the NAL units data aligned segmentation of the TB into variable-sized CBGs/mTBs 804a-e provides an effective partitioning alignment to the variable-sized NAL units data in contrast to current art, video coded traffic unaware equal segmentation and grouping approach. Furthermore, spectrum and radio resource effectiveness of the CBG-based retransmissions is preserved by video coded traffic aware variable-sized CBGs/mTBs. As the CBG/mTB #3 804c block is erroneously received, for example, it may be retransmitted and recovered in isolation of the enclosing large TB, thus saving considerable radio and spectrum resources, whilst also reducing the HARQ process delay as desirable for high-rate low-latency AR/VR/XR immersive applications.

The proposed alignment of NAL units data or NAL units data segments to TB and their enclosed FEC block partitioning (e.g., CBs/CBGs/mTBs) presents given the 5G NR asynchronous incremental redundancy ("IR") HARQ mechanisms an embedded rate-compatible and scalable retransmission strategy. This is an effect of the soft combining HARQ with redundancy version ("RV"), which exploits the structure of the FEC (e.g., low-density parity check ("LDPC") codes) to refresh the coded information bits transmitted to the receiver with each transmission cycle. As a result, with each retransmission, the receiver observes various sequences of coded bits which incrementally decrease the coding rate by a factor of $1/n_R$, where $n_R$ represents the total number of transmissions, including the original transmission and subsequent retransmissions of the same data and not accounting for flushing of the soft combining buffer at the receiver end.

However, in some embodiments of restricted bandwidth or radio resources better utilization of the latter may be required. In such cases, a video codec-aware RAN with knowledge of the video encoded data importance may apply the latter to unequally protect various NAL units data and data segments thereof by means of FEC UEP coding. Current implementations of 5G NR consider rate-compatible FEC designs (e.g. LDPC, Polar codes), yet these are only leveraged among retransmissions of the same CBs. However, the CBs within a TB are coded jointly at the same rate.

Instead, in some embodiments for video encoded data transmissions where bandwidth and radio resources are scarce relatively to the throughput demands, at least one of the video codec importance, delay, and jitter characteristics (either stochastically determined at the RAN level or signaled via source application/CN mechanisms) of the NAL units data/data segments representing the video coded traffic may be taken into account to characterize a general importance level at the PHY layer and to prioritize at the coding domain more important data (e.g., NAL unit I-slice data/data segment, base coding layer NAL units data) in detriment of less important data (e.g., NAL unit P-/B-slice data/data segment, enhancement spatial/temporal coding layer NAL units data).

In one embodiment, the coding rate of a higher importance NAL unit data/NAL unit data segment (e.g., a video coded slice or partition thereof) or NAL units data sequence (e.g., a video coding layer) is to be coded at a lower coding rate $R_1$ than the coding rate $R_2 > R_1$ of a less important NAL unit data/NAL unit data segment (e.g., a video coded slice or partition thereof) or NAL units data sequence (e.g., a video coding layer). In an embodiment with a high importance NAL unit data/NAL unit data segment (e.g. a video slice or partition thereof) or NAL units data sequence (e.g. a video coding layer), a medium importance NAL unit data/NAL unit data segment (e.g., a video coded slice or partition thereof) or NAL units data sequence (e.g., a video coding layer), and a low importance NAL unit data/NAL unit data segment (e.g., a video coded slice or partition thereof) or NAL units data sequence (e.g., a video coding layer), the high importance data may be coded at the lowest rate $R_1$, the medium importance data may be coded at a medium rate $R_2$, and the low importance data may be coded at a highest rate $R_3$, such that $0 < R_1 \leq R_2 \leq R_3 \leq 1$, (where R=1 may be in an embodiment the equivalent of uncoded transmission). In some embodiments, the case $R_1 = R_2 = R_3$ represents a subset where the video coded data importance is not considered/discarded, and the coding domain performs regular FEC without UEP as a subset of the solution space proposed.

Figure 9:
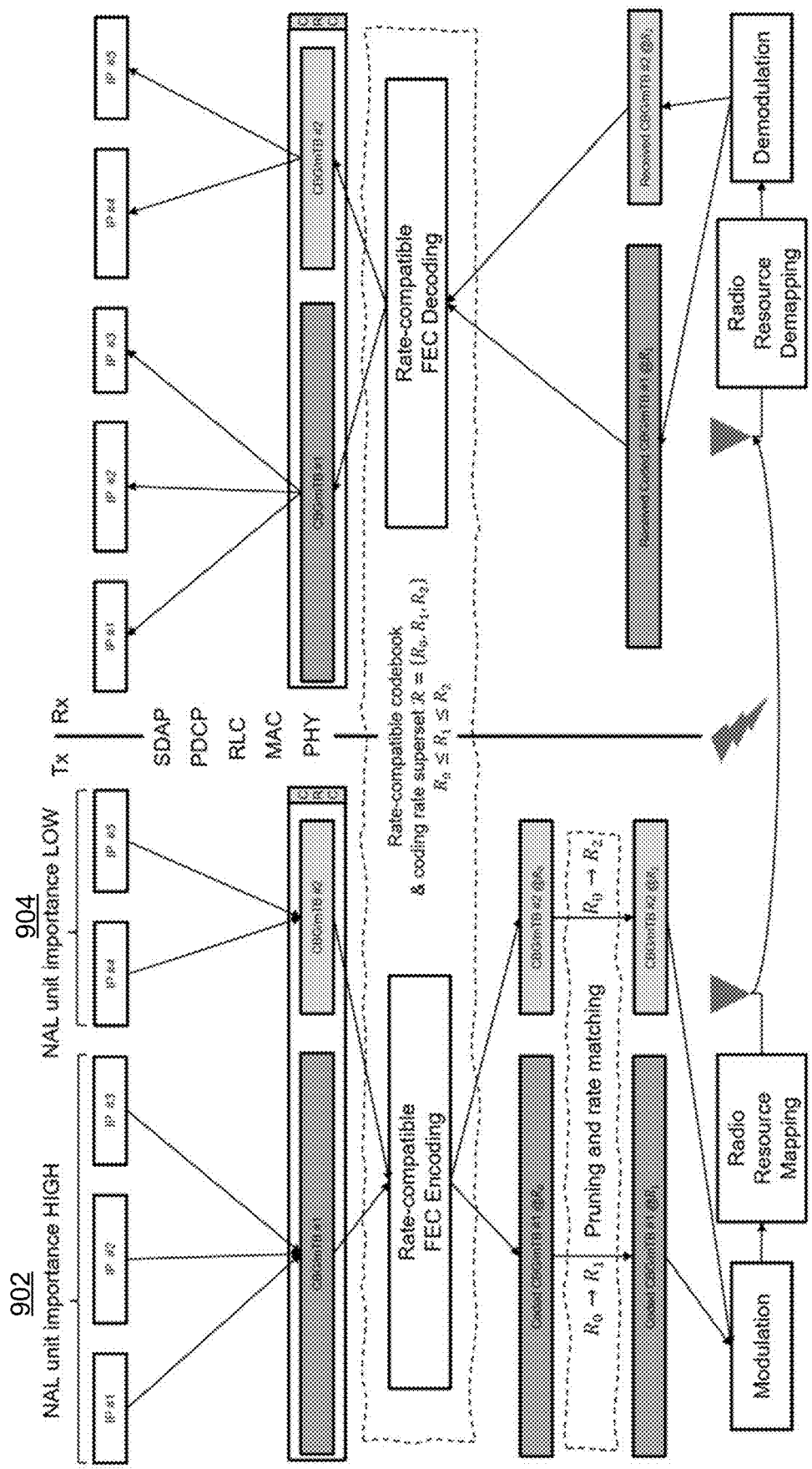
FIG. 9 depicts an embodiment displaying an FEC with UEP of a TB by means of two different FEC coding rates $R_1 < R_2$ whereby the lower FEC coding rate $R_1$ is allocated to the higher importance valued NAL unit data aligned CBG/mTB, and the higher FEC coding rate $R_2$ is allocated to the lower importance valued NAL unit data aligned CBG/mTB.

FIG. 9 presents an embodiment displaying a FEC with UEP of a TB by means of two different FEC coding rates $R_1 < R_2$ whereby the lower FEC coding rate $R_1$ is allocated to the higher importance valued NAL unit data aligned CBG/mTB 902, and the higher FEC coding rate $R_2$ is allocated to the lower importance valued NAL unit data aligned CBG/mTB 904. The encoding/decoding chain is an embodiment of a rate-compatible codebook design with coding rates superset $\mathcal{R} = \{R_0, R_1, R_2\}$, such that a base rate $R_0$ can be used to encode/decode rates $R_1, R_2$ by means of puncturing from $R_0$ coded bits sequences.

For tractable solutions, in some embodiments, the importance levels may be categorized and mapped to a preselected finite, discrete and ordered superset of rate-compatible coding rates, e.g., $\mathcal{R} = \{R_i | 0 \leq i < n, n \in \mathbb{N}, 0 < R_i < R_j < 1 \forall i, j\}$, achievable by rate-compatible FEC implementations (e.g., quasi-cyclic LDPC codes, protograph-based Polar codes, punctured Turbo codes etc.) where higher coding rates are obtained from lower coding rates without complexity increase by means of pruning or puncturing, respectively, whilst performing the same encoding and decoding procedures. Therefore, the encoding/decoding blocks can utilize the same encoder/decoder designs by adaptively selecting the punctured/pruned entries according to the rates in $\mathcal{R}$. As such, in one embodiment the coding block partitions of a TB, e.g., CBs/CBGs/mTBs, are to be coded at rates selected from $\mathcal{R}$ accordingly to the required level of FEC given the importance level of their enclosed data, e.g., video coded NAL unit/NAL unit segment (e.g., a video coded slice or partition thereof) or NAL units data sequence (e.g., a video coding layer).

In a 5G NR/beyond 5G NR video codec-aware embodiment with L mTB-aligned NAL units/NAL units segments, a method for coding rate allocation (for the mTBs within a TB) given a superset $\mathcal{R}$ and the available radio resources (e.g., resource elements, transmission layers, resource blocks) is to greedily find the $r_i$ picks out of the set $\mathcal{R}$ that maximize the sum $$\sum_{0 \le i < L-1} r_i^{-1} \mathrm{mTB}_i \le r_{NR\text{-}MCS}^{-1} \mathrm{TBS} + c_{CRC}, \qquad \text{Eq. 1}$$

where $\mathrm{mTB}_i$ denotes the size in bits of the mTB given the alignment to NAL units/NAL units segments.

The sum in Eq. 1 is upper bounded by the coded bit rate capacity estimate of the radio link over the TB's transmission interval given the available radio resources and statistical link information for the selection of a MCS configuration and subsequent determination of TB size, as TBS. The right hand side is thus obtained by $r_{NR\text{-}MCS}^{-1} \mathrm{TBS} + c_{CRC}$, e.g., the coded size of the TB at rate $r_{NR\text{-}MCS}$ and size TBS, whereas the latter two are obtained, e.g., following the procedures described in clause 5.1.3.1, for the coding rate $r_{NR\text{-}MCS}^{-1}$, and respectively, in clause 5.1.3.2 of 3GPP Technical Specification TS 38.214 (v16.5.0—April 2021). 5G; NR; Physical layer procedures for data, for the TB size, assuming no UEP of the TB. The $C_{CRC}$ constant represents a constant term given the coded bit budget available considering the rates $r_i^{-1}$, $r_{NR\text{-}MCS}^{-1}$, $\forall i$ and the CRCs of individual mTBs and TB. As such, the method described selects greedily and dynamically L rates (with replacement) from a set of given rates $\mathcal{R}$ to approach the upper bound of Eq. 1.

In some embodiments involving UEP at the TB level, the coding block partitions of the TB (e.g., CBs/CBGs/mTBs) have variable coding rates out of a superset $\mathcal{R}$ which require signaling, additionally to the variable number and size of the coding block partitions. This signaling of variable coding rate per coding block partition may be performed in an embodiment based on an indexed table given the FEC design via a specific bitfield configuration at least by one of a DM-RS signaling, a DCI scheduling PDSCH/PUSCH containing the CBGs/mTBs of the UEP TB, a UCI request of scheduling/scheduling update for the PUSCH containing the CBGs/mTBs of the UEP TB, a DCI periodic information signaling aligned with the SFI, and a front-loaded signaling encoded with a predetermined low-complexity (e.g., BCH code, polar code, Golay code etc.) efficient FEC mechanism as part of the enclosing TB of CBs/CBGs/mTBs.

In some embodiments the superset $\mathcal{R}$ may be reduced to one of its subsets particular to a given FEC implementation or configuration. In other embodiments the superset $\mathcal{R}$ may contain special rates, "0" and "1". The rate of 0 shall signify simply discarding the NAL unit/NAL unit segment-aligned coding block partition of a TB, whereas the rate of 1 marks uncoded transmission of data, e.g., no FEC. The discard operation of a NAL unit data/NAL unit data segments may in some embodiments be associated with lower importance NAL unit data elements (e.g., an enhancement spatial/temporal video coding layer, video coded B/P-frames/slices that do not act as references for any other frames/slices in a video coded sequence etc.) that may otherwise exceed the wireless link capacity, and subsequently impact the entire video coded stream QoE, or alternatively the video coded QoS flow, whereas their dropout would be of less significance for the experienced video playback quality.

Figure 10:
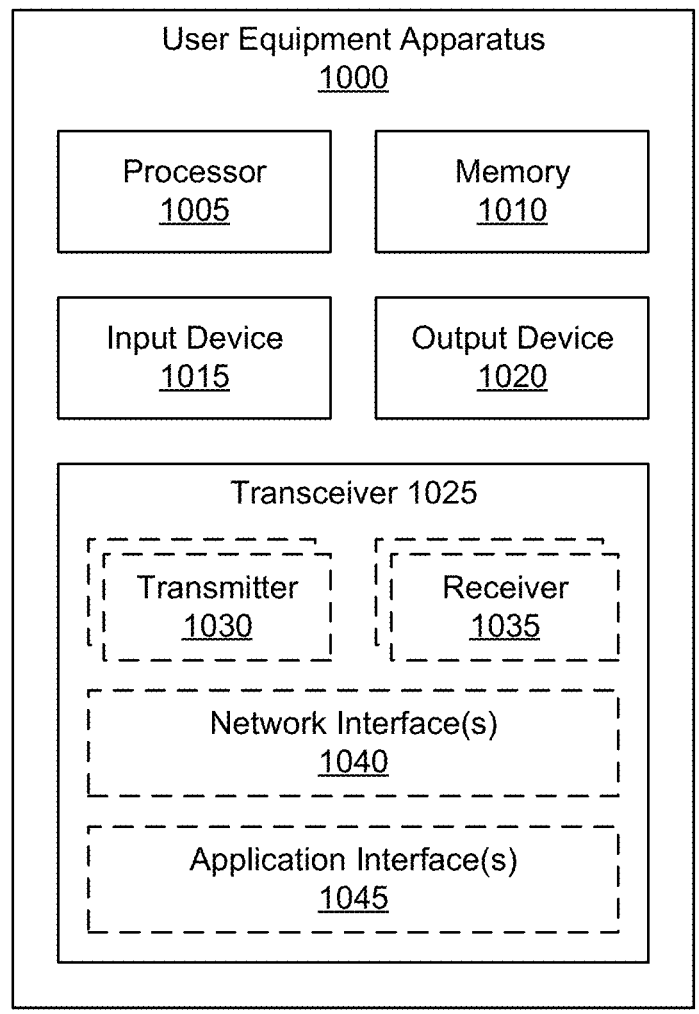
FIG. 10 is a block diagram illustrating one embodiment of a user equipment apparatus that may be used for video codec aware RAN configuration and unequal error protection coding.

FIG. 10 depicts a user equipment apparatus 1000 that may be used for video codec aware RAN configuration and unequal error protection coding, according to embodiments of the disclosure. In various embodiments, the user equipment apparatus 1000 is used to implement one or more of the solutions described above. The user equipment apparatus 1000 may be one embodiment of the remote unit 105 and/or the UE, described above. Furthermore, the user equipment apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the user equipment apparatus 1000 may not include any input device 1015 and/or output device 1020. In various embodiments, the user equipment apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. In some embodiments, the transceiver 1025 communicates with one or more cells (or wireless coverage areas) supported by one or more base units 121. In various embodiments, the transceiver 1025 is operable on unlicensed spectrum. Moreover, the transceiver 1025 may include multiple UE panel supporting one or more beams. Additionally, the transceiver 1025 may support at least one network interface 1040 and/or application interface 1045. The application interface(s) 1045 may support one or more APIs. The network interface(s) 1040 may support 3GPP reference points, such as Uu, N1, PC5, etc. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025. In certain embodiments, the processor 1005 may include an application processor (also known as "main processor") which manages application-domain and operating system ("OS") functions and a baseband processor (also known as "baseband radio processor") which manages radio functions.

In various embodiments, the processor 1005 and transceiver 1025 control the user equipment apparatus 1000 to implement the above described UE behaviors. In one embodiment, the transceiver 1025 receives an indication of a plurality of NAL unit aligned variable-length and/or variable coding rate TB partition elements and receives the NAL unit aligned variable-length and/or variable coding rate TB partition elements. In one embodiment, the processor 1005 decodes a FEC coding of a plurality of video coded NAL unit data enclosed in the TB partition elements and uses the received plurality of video coded NAL units data to reconstruct and decode a transmitted video coded stream for video playback.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to video codec aware RAN configuration and unequal error protection coding. For example, the memory 1010 may store various parameters, panel/beam configurations, resource assignments, policies, and the like as described above. In certain embodiments, the memory 1010 also stores program code and related data, such as an operating system or other controller algorithms operating on the user equipment apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, an LCD display, an LED display, an OLED display, a projector, or similar display device capable of outputting images, text, or the like to a user. As another, non-limiting, example, the output device 1020 may include a wearable display separate from, but communicatively coupled to, the rest of the user equipment apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all, or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 communicates with one or more network functions of a mobile communication network via one or more access networks. The transceiver 1025 operates under the control of the processor 1005 to transmit messages, data, and other signals and also to receive messages, data, and other signals. For example, the processor 1005 may selectively activate the transceiver 1025 (or portions thereof) at particular times in order to send and receive messages.

The transceiver 1025 includes at least transmitter 1030 and at least one receiver 1035. One or more transmitters 1030 may be used to provide UL communication signals to a base unit 121, such as the UL transmissions described herein. Similarly, one or more receivers 1035 may be used to receive DL communication signals from the base unit 121, as described herein. Although only one transmitter 1030 and one receiver 1035 are illustrated, the user equipment apparatus 1000 may have any suitable number of transmitters 1030 and receivers 1035. Further, the transmitter(s) 1030 and the receiver(s) 1035 may be any suitable type of transmitters and receivers. In one embodiment, the transceiver 1025 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1025, transmitters 1030, and receivers 1035 may be implemented as physically separate components that access a shared hardware resource and/or software resource, such as for example, the network interface 1040.

In various embodiments, one or more transmitters 1030 and/or one or more receivers 1035 may be implemented and/or integrated into a single hardware component, such as a multi-transceiver chip, a system-on-a-chip, an application-specific integrated circuit ("ASIC"), or other type of hardware component. In certain embodiments, one or more transmitters 1030 and/or one or more receivers 1035 may be implemented and/or integrated into a multi-chip module. In some embodiments, other components such as the network interface 1040 or other hardware components/circuits may be integrated with any number of transmitters 1030 and/or receivers 1035 into a single chip. In such embodiment, the transmitters 1030 and receivers 1035 may be logically configured as a transceiver 1025 that uses one more common control signals or as modular transmitters 1030 and receivers 1035 implemented in the same hardware chip or in a multi-chip module.

Figure 11:
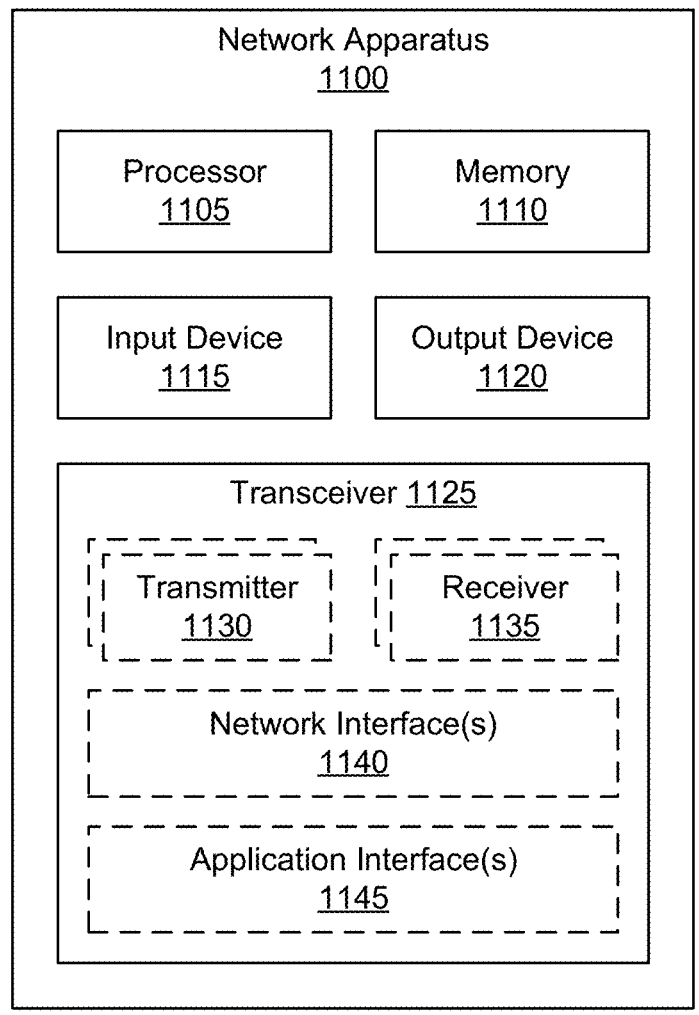
FIG. 11 is a block diagram illustrating one embodiment of a network apparatus that may be used for video codec aware RAN configuration and unequal error protection coding.

FIG. 11 depicts a network apparatus 1100 that may be used for video codec aware RAN configuration and unequal error protection coding, according to embodiments of the disclosure. In one embodiment, network apparatus 1100 may be one implementation of a RAN node, such as the base unit 121, the RAN node 210, or gNB, described above. Furthermore, the base network apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the network apparatus 1100 may not include any input device 1115 and/or output device 1120. In various embodiments, the network apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. Here, the transceiver 1125 communicates with one or more remote units 105. Additionally, the transceiver 1125 may support at least one network interface 1140 and/or application interface 1145. The application interface(s) 1145 may support one or more APIs. The network interface(s) 1140 may support 3GPP reference points, such as Uu, N1, N2 and N3. Other network interfaces 1140 may be supported, as understood by one of ordinary skill in the art.

The processor 1105, in one embodiment, may include any known controller capable of executing computer-readable instructions and/or capable of performing logical operations. For example, the processor 1105 may be a microcontroller, a microprocessor, a CPU, a GPU, an auxiliary processing unit, a FPGA, or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125. In certain embodiments, the processor 1105 may include an application processor (also known as "main processor") which manages application-domain and operating system ("OS") functions and a baseband processor (also known as "baseband radio processor") which manages radio function.

The memory 1110, in one embodiment, is a computer readable storage medium. In some embodiments, the memory 1110 includes volatile computer storage media. For example, the memory 1110 may include a RAM, including DRAM, SDRAM, and/or SRAM. In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to video codec aware RAN configuration and unequal error protection coding. For example, the memory 1110 may store parameters, configurations, resource assignments, policies, and the like, as described above. In certain embodiments, the memory 1110 also stores program code and related data, such as an operating system or other controller algorithms operating on the network apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the network apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all, or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 includes at least transmitter 1130 and at least one receiver 1135. One or more transmitters 1130 may be used to communicate with the UE, as described herein. Similarly, one or more receivers 1135 may be used to communicate with network functions in the non-public network ("NPN"), PLMN and/or RAN, as described herein. Although only one transmitter 1130 and one receiver 1135 are illustrated, the network apparatus 1100 may have any suitable number of transmitters 1130 and receivers 1135. Further, the transmitter(s) 1130 and the receiver(s) 1135 may be any suitable type of transmitters and receivers.

In one embodiment, the processor 1105 detects a video coded traffic stream and a video codec specification used to encode the video coded traffic stream. In one embodiment, the processor 1105 determines an awareness of video coded traffic ADUs of the video coded traffic stream as video coded NAL units of data. In one embodiment, the processor 1105 aligns, based on at least the determined awareness of the video coded ADUs, the video coded NAL units of the video coded traffic stream to physical layer ("PHY") transport elements and subsequent channel coding element partitions for a video coded traffic aware PHY transport. In one embodiment, the processor 1105 alignment, based on at least the determined awareness of the video coded ADUs comprises the processor 1105 mapping of the video coded NAL units to PHY transport elements, based on at least the determined awareness of the video coded ADUs.

In one embodiment, the processor 1105 determines a channel coding rate allocation of the channel coding element partitions based on the video coded traffic aware PHY transport. In one embodiment, the processor 1105 applies a FEC coding given at least the determined channel coding rate allocation of the video coded traffic aware PHY transport to channel coding element partitions for protection against radio transmission errors.

In one embodiment, the processor 1105 determines the awareness of the video coded traffic ADUs by at least one of an identification of the enclosed individual NAL units' boundaries and a determination of an assigned importance value to the individual NAL units, wherein the importance value is derived by upper or higher layers and/or functions and signaled synchronously with the NAL units via an information field encapsulated within at least one of upper layer protocol header information and a dedicated NAL unit aligned control information element.

In one embodiment, the processor 1105 determines one or more mTBs as flexible partition elements of a PHY TB, a mTB comprising a variable-length sized continuous block segment of a TB with an individually determined constant FEC channel coding rate and an individual retransmission configuration capability based on non-acknowledgement ("NACK") receiver feedback such that a plurality of successive mTBs unequally partitions a TB.

In one embodiment, the processor 1105 aligns the video coded NAL units by mapping at least one ADU to at least one of an encapsulation of at least one NAL unit data within one CB, an encapsulation of at least one NAL unit data within one CBG and/or an mTB, and an encapsulation of a sequence of NAL unit data segments within a CBG and/or an mTB.

In one embodiment, the alignment of at least one NAL unit data of the video coded traffic stream to the PHY transport elements is performed within one CB by grouping the CB within one CBG and/or mTB.

In one embodiment, the alignment of at least one of a NAL unit data, a plurality of NAL units data, and a plurality of NAL unit data segments is mapped and enclosed within one CBG and/or mTB such that the data spans multiple CBs with a last CB in the sequence formed as one of a sequence of data bits that completely utilize the size of the CB, a sequence of data bits that partially utilize the size of the CB where free bits are utilized with a known fixed bit sequence, and a sequence of data bits that partially utilize the size of the CB, where free bits are released to the PHY as additional resources for utilization.

In one embodiment, the processor 1105 utilizes the free bits released as additional resources to the PHY for related procedures to radio reference signaling related to at least one of a DM-RS to aid a receiver with radio detection, demodulation, and demapping, one of a CSI-RS and a SRS to aid receiver channel estimation procedures, and a PT-RS to aid the receiver with phase noise tracking and phase noise correction procedures.

In one embodiment, an indication to the receiver of the freed additional resources and their mapping to PHY REs is performed by a pattern index within one of a DCI scheduling a PDSCH and/or a PUSCH, a UCI requesting a PUSCH scheduling and/or scheduling update, and a UCI associated with a PUSCH transmission.

In one embodiment, the processor 1105 configures the TB elements mapping to one of a NAL unit data, a plurality of NAL units data, and at least one NAL unit data segment for video coded ADU traffic aware transmissions via one of a semi-statically determined and fixed size CBG configured to support individual CBG retransmissions upon an individual CBG NACK feedback from a receiver and a dynamically sized mTB configured to support individual mTB retransmissions upon an individual mTB NACK feedback from a receiver.

In one embodiment, the processor 1105, based on a TB of at least one video coded ADU traffic aware CBG, signals the determined video coded traffic awareness via at least one of a DCI scheduling of a corresponding PDSCH and/or PUSCH containing the video coded traffic aware CBG and a UCI request for a corresponding PDSCH and/or UCI associated with PUSCH containing the video coded traffic aware CBG.

In one embodiment, the processor 1105 signals the size of the dynamically sized mTBs to a receiver by at least one of a dedicated pattern and/or bit field within a DM-RS signaling, a DCI scheduling of a corresponding PDSCH and/or PUSCH containing the mTBs, a UCI request for a corresponding PUSCH scheduling and/or scheduling update wherein the mTBs are contained, a UCI associated with a PUSCH transmission containing the mTBs, a DCI periodic information signaling aligned with the SFI, and a front-loaded bit field signaling embedded into the enclosing TB of mTBs, wherein the bit field is encoded with a predetermined FEC code.

In one embodiment, the processor 1105 determines a predetermined minimum size bound for an mTB within a TB to avoid channel coding loss of short codewords due to over-segmentation of the TB into short-sized mTBs, wherein a plurality of NAL units data may be combined within such an mTB to fulfill the minimum size bound.

In one embodiment, the processor 1105 partitions an mTB of size S into M CBs with M one of $$M = \left\lceil \frac{S}{C_{max}} \right\rceil \text{ and } M = \left\lfloor \frac{S}{C_{max}} \right\rfloor,$$

wherein $C_{max}$ represents the maximum codeword size of an FEC code codebook used to encode the CBs and at least M−1 sequential CBs out of the total M CBs are of equal size.

In one embodiment, a subset of non-VCL NAL units are not considered for the NAL unit alignment to CBGs and/or mTBs to reduce alignment complexity, whereas any CBs, CBGs, and/or mTBs containing non-VCL NAL units of the subset are indicated to a receiver by one of a DCI special index embedded in a scheduling of PDSCH and/or PUSCH containing the CBs, CBGs, and/or mTBs, a UCI special index embedded into a request for scheduling and/or scheduling update of a PUSCH containing the CBs, CBGs, and/or mTBs, and a UCI special index embedded into a UCI associated with a PUSCH transmission containing the CBs, CBGs, and/or mTBs.

In one embodiment, the processor 1105 FEC encodes a TB with UEP such that CBGs and/or mTBs enclosed in the TB are assigned varying coding rates based on a preselected, finite, discrete and ordered superset of rate-compatible coding rates, $\mathcal{R} = \{R_i | 0 \leq i < n, n \in N, 0 < R_i < R_j < 1 \forall i, j, i < j\}$, based on a rate-compatible FEC code codebook design.

In one embodiment, the processor 1105 indicates to a receiver the allocated coding rates out of the rate-compatible superset $\mathcal{R}$ for individual CBGs and/or mTBs forming the UEP coded TB by means of a bit field configuration enclosed within at least one of a DM-RS signaling resource, a DCI scheduling a PDSCH and/or PUSCH containing the CBGs and/or mTBs of the UEP TB, a UCI request for a corresponding PUSCH scheduling and/or scheduling update wherein the CBGs and/or mTBs of the UEP TB are contained, a UCI associated with a PUSCH transmission containing the CBGs and/or mTBs of the UEP TB, a DCI periodic information signaling aligned with the SFI, and a front-loaded information field of the UEP TB encoded with a predetermined FEC code.

In one embodiment, the allocation of individual coding rates to the CBGs and/or mTBs forming the UEP TB is performed inversely proportional to the CBGs and/or mTBs enclosed NAL unit data importance values within a total constraint of estimated coded bit rate capacity over the TB's transmission interval upon an available radio link resources and statistical information such that at least two different coding rates are allocated, $R_1 < R_2$, whereby a first lower coding rate $R_1$ is used for CBGs and/or mTBs enclosing higher importance valued NAL unit data and/or NAL unit data segments, and respectively, a second higher coding rate $R_2$ is used for CBGs and/or mTBs enclosing lower valued NAL unit data and/or NAL unit data segments.

In one embodiment, the rate-compatible superset $\mathcal{R}$ comprises additionally the coding rates "1" and "0", wherein a coding rate of "1" indicates a non-FEC coded transmission of an associated CBG and/or mTB with an allocated coding rate of "1" and a coding rate of "0" indicates a discarding for transmission of an associated CBG and/or mTB with the allocated coding rate of "0".

Figure 12:
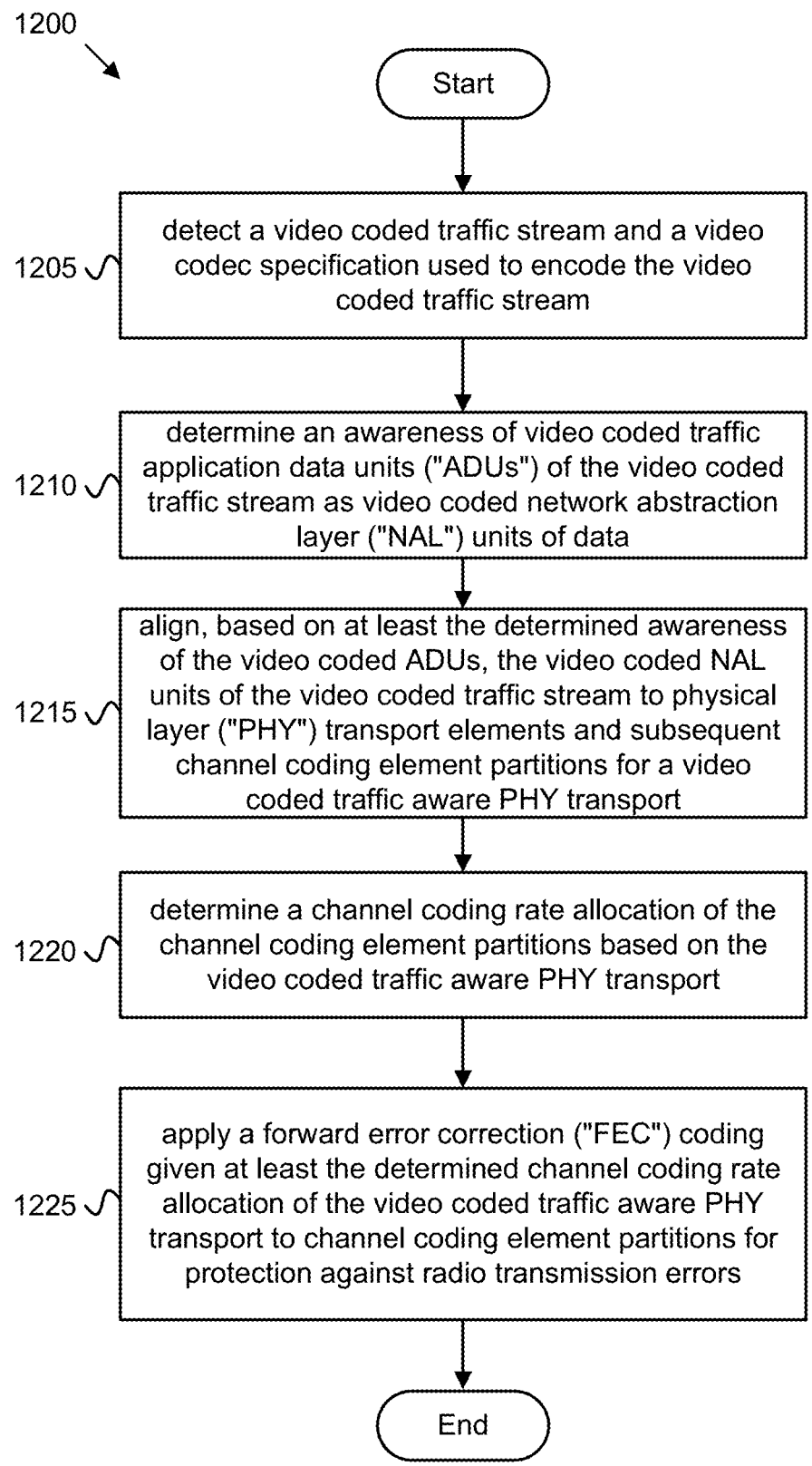
FIG. 12 is a flowchart diagram illustrating one embodiment of a method for video codec aware RAN configuration and unequal error protection coding.

FIG. 12 is a flowchart diagram of a method 1200 for video codec aware RAN configuration and unequal error protection coding. The method 1200 may be performed by a network entity such as a base node, a gNB, and/or the network equipment apparatus 1100. In some embodiments, the method 1200 may be performed by a processor executing program code, for example, a microcontroller, a microprocessor, a CPU, a GPU, an auxiliary processing unit, a FPGA, or the like.

In one embodiment, the method 1200 includes detecting 1205 a video coded traffic stream and a video codec specification used to encode the video coded traffic stream. In one embodiment, the method 1200 includes determining 1210 an awareness of video coded traffic ADUs of the video coded traffic stream as video coded NAL units of data. In one embodiment, the method 1200 includes aligning 1215, based on at least the determined awareness of the video coded ADUs, the video coded NAL units of the video coded traffic stream to PHY transport elements and subsequent channel coding element partitions for a video coded traffic aware PHY transport.

In one embodiment, the method 1200 includes determining 1220 a channel coding rate allocation of the channel coding element partitions based on the video coded traffic aware PHY transport. In one embodiment, the method 1200 includes applying 1225 a FEC coding given at least the determined channel coding rate allocation of the video coded traffic aware PHY transport to channel coding element partitions for protection against radio transmission errors, and the method 1200 ends.

Figure 13:
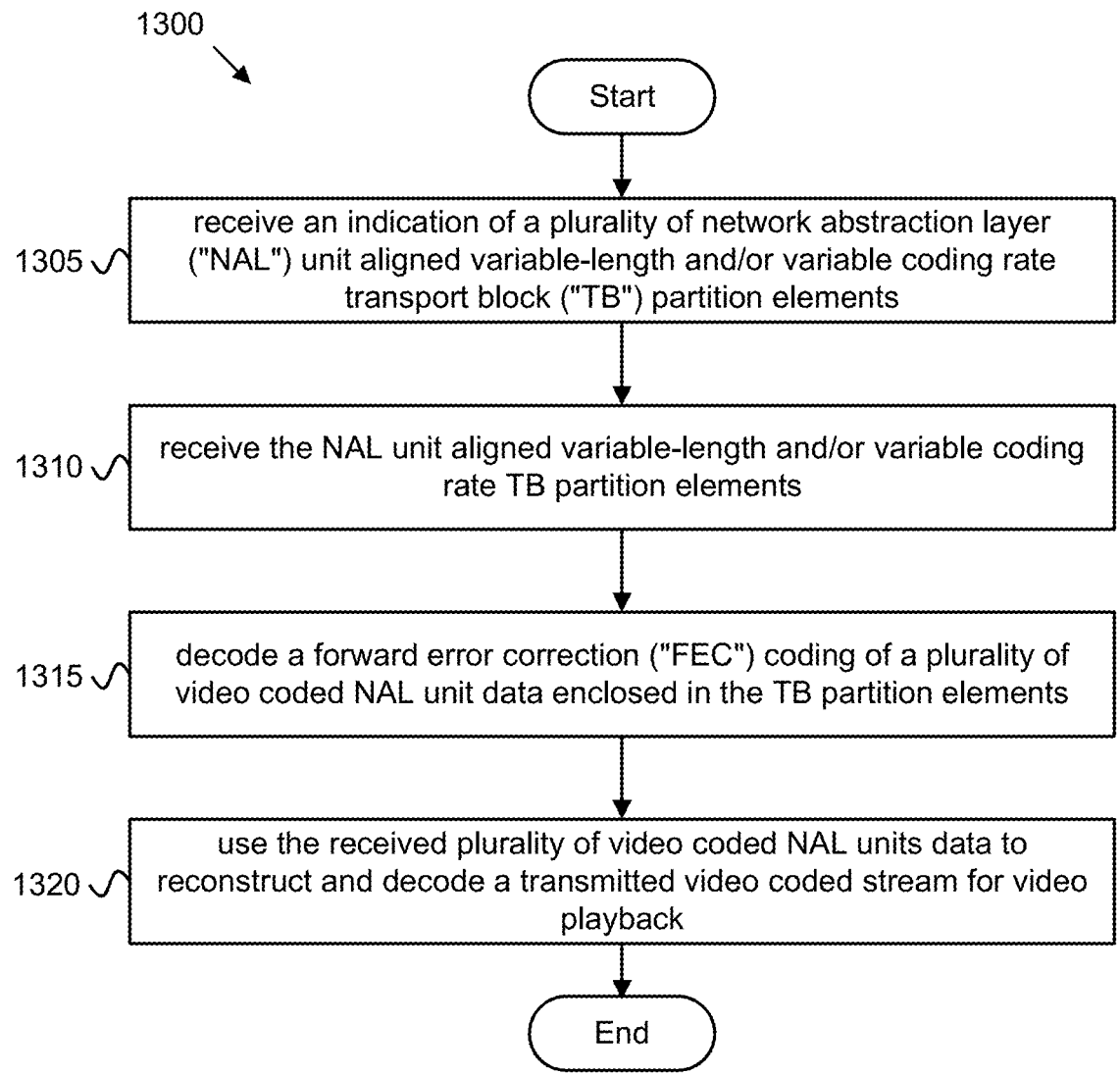
FIG. 13 is a flowchart diagram illustrating one embodiment of another method for video codec aware RAN configuration and unequal error protection coding.

FIG. 13 is a flowchart diagram of a method 1300 for video codec aware RAN configuration and unequal error protection coding. The method 1300 may be performed by a remote unit 105 such as a UE or a user equipment apparatus 1000. In some embodiments, the method 1300 may be performed by a processor executing program code, for example, a microcontroller, a microprocessor, a CPU, a GPU, an auxiliary processing unit, a FPGA, or the like.

In one embodiment, the method 1300 includes receiving 1305 an indication of a plurality of NAL unit aligned variable-length and/or variable coding rate TB partition elements. In one embodiment, the method 1300 includes receiving 1310 the NAL unit aligned variable-length and/or variable coding rate TB partition elements.

In one embodiment, the method 1300 includes decoding 1315 a FEC coding of a plurality of video coded NAL unit data enclosed in the TB partition elements. In one embodiment, the method 1300 includes using 1320 the received plurality of video coded NAL units data to reconstruct and decode a transmitted video coded stream for video playback, and the method 1300 ends.

A first apparatus is disclosed for video codec aware RAN configuration and unequal error protection coding. The first apparatus may include a network entity such as a base node, a gNB, and/or the network equipment apparatus 1100. In some embodiments, the first apparatus includes a processor executing program code, for example, a microcontroller, a microprocessor, a CPU, a GPU, an auxiliary processing unit, a FPGA, or the like.

In one embodiment, the first apparatus includes a processor that detects a video coded traffic stream and a video codec specification used to encode the video coded traffic stream. In one embodiment, the processor determines an awareness of video coded traffic application data units ("ADUs") of the video coded traffic stream as video coded network abstraction layer ("NAL") units of data. In one embodiment, the processor aligns, based on at least the determined awareness of the video coded ADUs, the video coded NAL units of the video coded traffic stream to physical layer ("PHY") transport elements and subsequent channel coding element partitions for a video coded traffic aware PHY transport.

In one embodiment, the processor determines a channel coding rate allocation of the channel coding element partitions based on the video coded traffic aware PHY transport. In one embodiment, the processor applies a forward error correction ("FEC") coding given at least the determined channel coding rate allocation of the video coded traffic aware PHY transport to channel coding element partitions for protection against radio transmission errors.

In one embodiment, the processor determines the awareness of the video coded traffic ADUs by at least one of an identification of the enclosed individual NAL units' boundaries and a determination of an assigned importance value to the individual NAL units, wherein the importance value is derived by upper or higher layers and/or functions and signaled synchronously with the NAL units via an information field encapsulated within at least one of upper layer protocol header information and a dedicated NAL unit aligned control information element.

In one embodiment, the processor determines one or more mini-transport blocks ("mTBs") as flexible partition elements of a PHY TB, a mTB comprising a variable-length sized continuous block segment of a TB with an individually determined constant forward error correction ("FEC") channel coding rate and an individual retransmission configuration capability based on non-acknowledgement ("NACK") receiver feedback such that a plurality of successive mTBs unequally partitions a TB.

In one embodiment, the processor aligns the video coded NAL units by mapping at least one ADU to at least one of an encapsulation of at least one NAL unit data within one coding block ("CB"), an encapsulation of at least one NAL unit data within one CB group ("CBG") and/or an mTB, and an encapsulation of a sequence of NAL unit data segments within a CBG and/or an mTB.

In one embodiment, the alignment of at least one NAL unit data of the video coded traffic stream to the PHY transport elements is performed within one CB by grouping the CB within one CBG and/or mTB.

In one embodiment, the alignment of at least one of a NAL unit data, a plurality of NAL units data, and a plurality of NAL unit data segments is mapped and enclosed within one CBG and/or mTB such that the data spans multiple CBs with a last CB in the sequence formed as one of a sequence of data bits that completely utilize the size of the CB, a sequence of data bits that partially utilize the size of the CB where free bits are utilized with a known fixed bit sequence, and a sequence of data bits that partially utilize the size of the CB, where free bits are released to the PHY as additional resources for utilization.

In one embodiment, the processor utilizes the free bits released as additional resources to the PHY for related procedures to radio reference signaling related to at least one of a demodulation reference signal ("DM-RS") to aid a receiver with radio detection, demodulation, and demapping, one of a channel state information reference signal ("CSI-RS") and a sounding reference signal ("SRS") to aid receiver channel estimation procedures, and a phase tracking reference signal ("PT-RS") to aid the receiver with phase noise tracking and phase noise correction procedures.

In one embodiment, an indication to the receiver of the freed additional resources and their mapping to PHY resource elements ("REs") is performed by a pattern index within one of a downlink control information ("DCI") scheduling a physical downlink shared channel ("PDSCH") and/or a physical uplink shared channel ("PUSCH"), an uplink control information ("UCI") requesting a PUSCH scheduling and/or scheduling update, and a UCI associated with a PUSCH transmission.

In one embodiment, the processor configures the TB elements mapping to one of a NAL unit data, a plurality of NAL units data, and at least one NAL unit data segment for video coded ADU traffic aware transmissions via one of a semi-statically determined and fixed size CBG configured to support individual CBG retransmissions upon an individual CBG NACK feedback from a receiver and a dynamically sized mTB configured to support individual mTB retransmissions upon an individual mTB NACK feedback from a receiver.

In one embodiment, the processor, based on a TB of at least one video coded ADU traffic aware CBG, signals the determined video coded traffic awareness via at least one of a DCI scheduling of a corresponding PDSCH and/or PUSCH containing the video coded traffic aware CBG and a UCI request for a corresponding PDSCH and/or UCI associated with PUSCH containing the video coded traffic aware CBG.

In one embodiment, the processor signals the size of the dynamically sized mTBs to a receiver by at least one of a dedicated pattern and/or bit field within a DM-RS signaling, a DCI scheduling of a corresponding PDSCH and/or PUSCH containing the mTBs, a UCI request for a corresponding PUSCH scheduling and/or scheduling update wherein the mTBs are contained, a UCI associated with a PUSCH transmission containing the mTBs, a DCI periodic information signaling aligned with the slot format indicator ("SFI"), and a front-loaded bit field signaling embedded into the enclosing TB of mTBs, wherein the bit field is encoded with a predetermined FEC code.

In one embodiment, the processor determines a predetermined minimum size bound for an mTB within a TB to avoid channel coding loss of short codewords due to over-segmentation of the TB into short-sized mTBs, wherein a plurality of NAL units data may be combined within such an mTB to fulfill the minimum size bound.

In one embodiment, the processor partitions an mTB of size S into M CBs with M one of $$M = \left\lceil \frac{S}{C_{max}} \right\rceil \text{ and } M = \left\lfloor \frac{S}{C_{max}} \right\rfloor,$$

wherein $C_{max}$ represents the maximum codeword size of an FEC code codebook used to encode the CBs and at least M−1 sequential CBs out of the total M CBs are of equal size.

In one embodiment, a subset of non-video coding layer ("non-VCL") NAL units are not considered for the NAL unit alignment to CBGs and/or mTBs to reduce alignment complexity, whereas any CBs, CBGs, and/or mTBs containing non-VCL NAL units of the subset are indicated to a receiver by one of a DCI special index embedded in a scheduling of PDSCH and/or PUSCH containing the CBs, CBGs, and/or mTBs, a UCI special index embedded into a request for scheduling and/or scheduling update of a PUSCH containing the CBs, CBGs, and/or mTBs, and a UCI special index embedded into a UCI associated with a PUSCH transmission containing the CBs, CBGs, and/or mTBs.

In one embodiment, the processor FEC encodes a TB with unequal error protection ("UEP") such that CBGs and/or mTBs enclosed in the TB are assigned varying coding rates based on a preselected, finite, discrete and ordered superset of rate-compatible coding rates, $\mathcal{R}=\{R_i|0\leq i<n,\ n\in N, 0<R_i<R_j<1\forall i, j, i<j\}$, based on a rate-compatible FEC code codebook design.

In one embodiment, the processor indicates to a receiver the allocated coding rates out of the rate-compatible superset $\mathcal{R}$ for individual CBGs and/or mTBs forming the UEP coded TB by means of a bit field configuration enclosed within at least one of a DM-RS signaling resource, a DCI scheduling a PDSCH and/or PUSCH containing the CBGs and/or mTBs of the UEP TB, a UCI request for a corresponding PUSCH scheduling and/or scheduling update wherein the CBGs and/or mTBs of the UEP TB are contained, a UCI associated with a PUSCH transmission containing the CBGs and/or mTBs of the UEP TB, a DCI periodic information signaling aligned with the SFI, and a front-loaded information field of the UEP TB encoded with a predetermined FEC code.

In one embodiment, the allocation of individual coding rates to the CBGs and/or mTBs forming the UEP TB is performed inversely proportional to the CBGs and/or mTBs enclosed NAL unit data importance values within a total constraint of estimated coded bit rate capacity over the TB's transmission interval upon an available radio link resources and statistical information such that at least two different coding rates are allocated, $R_1<R_2$, whereby a first lower coding rate $R_1$ is used for CBGs and/or mTBs enclosing higher importance valued NAL unit data and/or NAL unit data segments, and respectively, a second higher coding rate $R_2$ is used for CBGs and/or mTBs enclosing lower valued NAL unit data and/or NAL unit data segments.

In one embodiment, the rate-compatible superset $\mathcal{R}$ comprises additionally the coding rates "1" and "0", wherein a coding rate of "1" indicates a non-FEC coded transmission of an associated CBG and/or mTB with an allocated coding rate of "1" and a coding rate of "0" indicates a discarding for transmission of an associated CBG and/or mTB with the allocated coding rate of "0".

A first method is disclosed for video codec aware RAN configuration and unequal error protection coding. The first method may be performed by a network entity such as a base node, a gNB, and/or the network equipment apparatus 1100. In some embodiments, the first method may be performed by a processor executing program code, for example, a microcontroller, a microprocessor, a CPU, a GPU, an auxiliary processing unit, a FPGA, or the like.

In one embodiment, the first method includes detecting a video coded traffic stream and a video codec specification used to encode the video coded traffic stream. In one embodiment, the first method includes determining an awareness of video coded traffic application data units ("ADUs") of the video coded traffic stream as video coded network abstraction layer ("NAL") units of data. In one embodiment, the first method includes aligning, based on at least the determined awareness of the video coded ADUs, the video coded NAL units of the video coded traffic stream to physical layer ("PHY") transport elements and subsequent channel coding element partitions for a video coded traffic aware PHY transport.

In one embodiment, the first method includes determining a channel coding rate allocation of the channel coding element partitions based on the video coded traffic aware PHY transport. In one embodiment, the first method includes applying a forward error correction ("FEC") coding given at least the determined channel coding rate allocation of the video coded traffic aware PHY transport to channel coding element partitions for protection against radio transmission errors.

In one embodiment, the first method includes determining the awareness of the video coded traffic ADUs by at least one of an identification of the enclosed individual NAL units' boundaries and a determination of an assigned importance value to the individual NAL units, wherein the importance value is derived by upper or higher layers and/or functions and signaled synchronously with the NAL units via an information field encapsulated within at least one of upper layer protocol header information and a dedicated NAL unit aligned control information element.

In one embodiment, the first method includes determining one or more mini-transport blocks ("mTBs") as flexible partition elements of a PHY TB, a mTB comprising a variable-length sized continuous block segment of a TB with an individually determined constant forward error correction ("FEC") channel coding rate and an individual retransmission configuration capability based on non-acknowledgement ("NACK") receiver feedback such that a plurality of successive mTBs unequally partitions a TB.

In one embodiment, the first method includes aligning the video coded NAL units by mapping at least one ADU to at least one of an encapsulation of at least one NAL unit data within one coding block ("CB"), an encapsulation of at least one NAL unit data within one CB group ("CBG") and/or an mTB, and an encapsulation of a sequence of NAL unit data segments within a CBG and/or an mTB.

In one embodiment, the alignment of at least one NAL unit data of the video coded traffic stream to the PHY transport elements is performed within one CB by grouping the CB within one CBG and/or mTB.

In one embodiment, the alignment of at least one of a NAL unit data, a plurality of NAL units data, and a plurality of NAL unit data segments is mapped and enclosed within one CBG and/or mTB such that the data spans multiple CBs with a last CB in the sequence formed as one of a sequence of data bits that completely utilize the size of the CB, a sequence of data bits that partially utilize the size of the CB where free bits are utilized with a known fixed bit sequence, and a sequence of data bits that partially utilize the size of the CB, where free bits are released to the PHY as additional resources for utilization.

In one embodiment, the first method includes utilizing the free bits released as additional resources to the PHY for related procedures to radio reference signaling related to at least one of a demodulation reference signal ("DM-RS") to aid a receiver with radio detection, demodulation, and demapping, one of a channel state information reference signal ("CSI-RS") and a sounding reference signal ("SRS") to aid receiver channel estimation procedures, and a phase tracking reference signal ("PT-RS") to aid the receiver with phase noise tracking and phase noise correction procedures.

In one embodiment, an indication to the receiver of the freed additional resources and their mapping to PHY resource elements ("REs") is performed by a pattern index within one of a downlink control information ("DCI") scheduling a physical downlink shared channel ("PDSCH") and/or a physical uplink shared channel ("PUSCH"), an uplink control information ("UCI") requesting a PUSCH scheduling and/or scheduling update, and a UCI associated with a PUSCH transmission.

In one embodiment, the first method includes configuring the TB elements mapping to one of a NAL unit data, a plurality of NAL units data, and at least one NAL unit data segment for video coded ADU traffic aware transmissions via one of a semi-statically determined and fixed size CBG configured to support individual CBG retransmissions upon an individual CBG NACK feedback from a receiver and a dynamically sized mTB configured to support individual mTB retransmissions upon an individual mTB NACK feedback from a receiver.

In one embodiment, the first method includes, based on a TB of at least one video coded ADU traffic aware CBG, signaling the determined video coded traffic awareness via at least one of a DCI scheduling of a corresponding PDSCH and/or PUSCH containing the video coded traffic aware CBG and a UCI request for a corresponding PDSCH and/or UCI associated with PUSCH containing the video coded traffic aware CBG.

In one embodiment, the first method includes signaling the size of the dynamically sized mTBs to a receiver by at least one of a dedicated pattern and/or bit field within a DM-RS signaling, a DCI scheduling of a corresponding PDSCH and/or PUSCH containing the mTBs, a UCI request for a corresponding PUSCH scheduling and/or scheduling update wherein the mTBs are contained, a UCI associated with a PUSCH transmission containing the mTBs, a DCI periodic information signaling aligned with the slot format indicator ("SFI"), and a front-loaded bit field signaling embedded into the enclosing TB of mTBs, wherein the bit field is encoded with a predetermined FEC code.

In one embodiment, the first method includes determining a predetermined minimum size bound for an mTB within a TB to avoid channel coding loss of short codewords due to over-segmentation of the TB into short-sized mTBs, wherein a plurality of NAL units data may be combined within such an mTB to fulfill the minimum size bound.

In one embodiment, the first method includes partitioning an mTB of size S into M CBs with M one of $$M = \left\lceil \frac{S}{C_{max}} \right\rceil \text{ and } M = \left\lfloor \frac{S}{C_{max}} \right\rfloor,$$

wherein $C_{max}$ represents the maximum codeword size of an FEC code codebook used to encode the CBs and at least $M-1$ sequential CBs out of the total M CBs are of equal size.

In one embodiment, a subset of non-video coding layer ("non-VCL") NAL units are not considered for the NAL unit alignment to CBGs and/or mTBs to reduce alignment complexity, whereas any CBs, CBGs, and/or mTBs containing non-VCL NAL units of the subset are indicated to a receiver by one of a DCI special index embedded in a scheduling of PDSCH and/or PUSCH containing the CBs, CBGs, and/or mTBs, a UCI special index embedded into a request for scheduling and/or scheduling update of a PUSCH containing the CBs, CBGs, and/or mTBs, and a UCI special index embedded into a UCI associated with a PUSCH transmission containing the CBs, CBGs, and/or mTBs.

In one embodiment, the first method includes FEC coding a TB with unequal error protection ("UEP") such that CBGs and/or mTBs enclosed in the TB are assigned varying coding rates based on a preselected, finite, discrete and ordered superset of rate-compatible coding rates, $\mathcal{R} = \{R_i | 0 \leq i < n, n \in \mathbb{N}, 0 < R_i < R_j < 1 \forall i, j, i < j\}$, based on a rate-compatible FEC code codebook design.

In one embodiment, the first method includes indicating to a receiver the allocated coding rates out of the rate-compatible superset $\mathcal{R}$ for individual CBGs and/or mTBs forming the UEP coded TB by means of a bit field configuration enclosed within at least one of a DM-RS signaling resource, a DCI scheduling a PDSCH and/or PUSCH containing the CBGs and/or mTBs of the UEP TB, a UCI request for a corresponding PUSCH scheduling and/or scheduling update wherein the CBGs and/or mTBs of the UEP TB are contained, a UCI associated with a PUSCH transmission containing the CBGs and/or mTBs of the UEP TB, a DCI periodic information signaling aligned with the SFI, and a front-loaded information field of the UEP TB encoded with a predetermined FEC code.

In one embodiment, the allocation of individual coding rates to the CBGs and/or mTBs forming the UEP TB is performed inversely proportional to the CBGs and/or mTBs enclosed NAL unit data importance values within a total constraint of estimated coded bit rate capacity over the TB's transmission interval upon an available radio link resources and statistical information such that at least two different coding rates are allocated, $R_1 < R_2$, whereby a first lower coding rate $R_1$ is used for CBGs and/or mTBs enclosing higher importance valued NAL unit data and/or NAL unit data segments, and respectively, a second higher coding rate $R_2$ is used for CBGs and/or mTBs enclosing lower valued NAL unit data and/or NAL unit data segments.

In one embodiment, the rate-compatible superset $\mathcal{R}$ comprises additionally the coding rates "1" and "0", wherein a coding rate of "1" indicates a non-FEC coded transmission of an associated CBG and/or mTB with an allocated coding rate of "1" and a coding rate of "0" indicates a discarding for transmission of an associated CBG and/or mTB with the allocated coding rate of "0".

A second apparatus is disclosed for video codec aware RAN configuration and unequal error protection coding. The second apparatus may include a remote unit 105 such as a UE or a user equipment apparatus 1000. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver that receives an indication of a plurality of network abstraction layer ("NAL") unit aligned variable-length and/or variable coding rate transport block ("TB") partition elements and receives the NAL unit aligned variable-length and/or variable coding rate TB partition elements.

In one embodiment, the second apparatus includes a processor that decodes a forward error correction ("FEC") coding of a plurality of video coded NAL unit data enclosed in the TB partition elements and uses the received plurality of video coded NAL units data to reconstruct and decode a transmitted video coded stream for video playback.

A second method is disclosed for video codec aware RAN configuration and unequal error protection coding. The second method may be performed by a remote unit 105 such as a UE or a user equipment apparatus 1000. In some embodiments, the second method may be performed by a processor executing program code, for example, a microcontroller, a microprocessor, a CPU, a GPU, an auxiliary processing unit, a FPGA, or the like.

In one embodiment, the second method includes receiving an indication of a plurality of network abstraction layer ("NAL") unit aligned variable-length and/or variable coding rate transport block ("TB") partition elements and receiving the NAL unit aligned variable-length and/or variable coding rate TB partition elements.

In one embodiment, the second method includes decoding a forward error correction ("FEC") coding of a plurality of video coded NAL unit data enclosed in the TB partition elements and using the received plurality of video coded NAL units data to reconstruct and decode a transmitted video coded stream for video playback.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   at least one memory, and
   at least one processor coupled with the at least one memory and configured to cause the apparatus to:
   detect a video coded traffic stream and a video codec profile for encoding the video coded traffic stream;
   determine an awareness of protocol data unit (PDU) sets of the video coded traffic stream, wherein each PDU set comprises at least one PDU that maps to an application data unit (ADU) comprising at least one network abstraction layer (NAL) unit of video coded data;
   align, based on at least the awareness of PDU sets, each PDU set of the video coded traffic stream to physical layer (PHY) transport elements and channel coding element partitions for a video coded traffic aware PHY transport;
   determine a channel coding rate allocation of the channel coding element partitions based on the video coded traffic aware PHY transport; and
   apply a forward error correction (FEC) coding to the channel coding element partitions based in part on the channel coding rate allocation.

2. The apparatus of claim 1, wherein the at least one processor is configured to cause the apparatus to determine the awareness of PDU sets of the video coded traffic based on at least one of:
   an indication of at least one boundary of each of the PDU sets;
   an indication of at least one boundary of each of the NAL units of video coded data comprised in each of the PDU sets;
   an importance value, wherein the importance value is based on higher layers and signaled synchronously with the PDU sets via an information field encapsulated within at least one of upper layer protocol header information and a dedicated PDU set aligned control information element.

3. The apparatus of claim 1, wherein the at least one processor is configured to cause the apparatus to determine one or more mini-transport blocks (mTBs) as flexible partition elements of a PHY transport block (TB), wherein an mTB comprises a variable-length sized continuous block segment of a TB associated with a separate constant FEC channel coding rate and a separate retransmission configuration capability.

4. The apparatus of claim 3, wherein the at least one processor is configured to cause the apparatus to align each NAL unit of video coded data by mapping at least one PDU set to at least one of:

an encapsulation of at least one NAL unit of video coded data within one coding block (CB);

an encapsulation of at least one NAL unit within one CB group (CBG) or an mTB; or an encapsulation of a sequence of NAL unit segments within a CBG or an mTB.

5. The apparatus of claim 4, wherein the at least one processor is configured cause the apparatus to align at least one NAL unit of video coded data of the video coded traffic stream to the PHY transport elements within one CB by grouping the CB within one CBG or mTB.

6. The apparatus of claim 4, wherein the at least one processor is configured to cause the apparatus to map and enclose within one CBG or mTB the alignment of at least one of a NAL unit of video coded data, a plurality of NAL units of video coded data, and a plurality of NAL unit of video coded data segments, wherein the data spans multiple CBs with a last CB in the sequence formed as one of:

a sequence of data bits that completely utilize the size of the CB;

a sequence of data bits that partially utilize the size of the CB where free bits are utilized with a known fixed bit sequence; and a sequence of data bits that partially utilize the size of the CB, where free bits are released to the PHY as additional resources for utilization.

7. The apparatus of claim 6, wherein the at least one processor is configured to cause the apparatus to utilize the free bits released as additional resources to the PHY for related procedures to radio reference signaling related to at least one of:

a demodulation reference signal (DM-RS) to aid with radio detection, demodulation, and demapping;

one of a channel state information reference signal (CSI-RS) and a sounding reference signal (SRS) to aid channel estimation procedures; and a phase tracking reference signal (PT-RS) to aid with phase noise tracking and phase noise correction procedures.

8. The apparatus of claim 6, wherein the at least one processor is configured to cause the apparatus to provide an indication of the freed additional resources and their mapping to PHY resource elements (REs) by a pattern index within one of:

a downlink control information (DCI) scheduling a physical downlink shared channel (PDSCH) or a physical uplink shared channel (PUSCH);

an uplink control information (UCI) requesting a PUSCH scheduling or scheduling update; and a UCI associated with a PUSCH transmission.

9. The apparatus of claim 4, wherein the at least one processor is configured to cause the apparatus to configure the mapping via one of:

a semi-statically determined and fixed size CBG configured to support individual CBG retransmissions upon an individual CBG NACK feedback; and a dynamically sized mTB configured to support individual mTB retransmissions upon an individual mTB NACK feedback.

10. The apparatus of claim 9, wherein the at least one processor is configured to cause the apparatus to, based on a TB of at least one video coded PDU set traffic aware CBG, signal the determined video coded traffic awareness via at least one of:

a DCI scheduling of a corresponding PDSCH or PUSCH containing the video coded traffic aware CBG; and a UCI request for a corresponding PDSCH or UCI associated with PUSCH containing the video coded traffic aware CBG.

11. The apparatus of claim 9, wherein the at least one processor is configured to cause the apparatus to signal the size of the dynamically sized mTB by at least one of:

a dedicated pattern or bit field within a DM-RS signaling;

a DCI scheduling of a corresponding PDSCH or PUSCH containing the mTBs;

a UCI request for a corresponding PUSCH scheduling or scheduling update wherein the mTBs are contained;

a UCI associated with a PUSCH transmission containing the mTBs;

a DCI periodic information signaling aligned with the slot format indicator (SFI); and a front-loaded bit field signaling embedded into the enclosing TB of mTBs, wherein the bit field is encoded with a predetermined FEC code.

12. The apparatus of claim 11, wherein the at least one processor is configured to cause the apparatus to determine a predetermined minimum size bound for an mTB within a TB to avoid channel coding loss of short codewords due to over-segmentation of the TB into short-sized mTBs, wherein a plurality of NAL units data may be combined within such an mTB to fulfill the minimum size bound.

13. The apparatus of claim 12, wherein the at least one processor is configured to cause the apparatus to partition an mTB of size S into M CBs with M one of $$M = \left\lceil \frac{S}{C_{max}} \right\rceil \text{ and } M = \left\lfloor \frac{S}{C_{max}} \right\rfloor,$$

wherein $C_{max}$ represents a maximum codeword size of an FEC codebook used to encode the CBs and at least M−1 sequential CBs out of the total M CBs are of equal size.

14. The apparatus of claim 4, wherein the at least one processor is configured to cause the apparatus to not consider a subset of non-video coding layer (non-VCL) NAL units of video coded data for the NAL unit alignment to CBGs or mTBs to reduce alignment complexity, whereas CBs, CBGs, or mTBs containing non-VCL NAL units of video coded data of the subset are indicated by one of:

a DCI special index embedded in a scheduling of PDSCH or PUSCH containing the CBs, CBGs, or mTBs;

a UCI special index embedded into a request for scheduling or scheduling update of a PUSCH containing the CBs, CBGs, or mTBs; and a UCI special index embedded into a UCI associated with a PUSCH transmission containing the CBs, CBGs, or mTBs.

15. The apparatus of claim 4, wherein the at least one processor is configured to cause the apparatus to FEC encode a TB with unequal error protection (UEP) such that CBGs or mTBs enclosed in the TB are assigned varying coding rates based on a preselected, finite, discrete and ordered superset of rate-compatible coding rates, $\mathcal{R} = \{R_i | 0 \leq i < n, n \in \mathbb{N}, 0 < R_i < R_j < 1 \forall i, j, i < j\}$, based on a rate-compatible FEC code codebook design.

16. The apparatus of claim 15, wherein the at least one processor is configured to indicate the allocated coding rates out of the ordered superset of rate-compatible coding rates $\mathcal{R}$ for individual CBGs or mTBs forming the UEP coded TB by means of a bit field configuration enclosed within at least one of:

a DM-RS signaling resource;

a DCI scheduling a PDSCH or PUSCH containing the CBGs or mTBs of the UEP coded TB;
a UCI request for a corresponding PUSCH scheduling or scheduling update wherein the CBGs or mTBs of the UEP coded TB are contained;
a UCI associated with a PUSCH transmission containing the CBGs or mTBs of the UEP coded TB;
a DCI periodic information signaling aligned with the slot format indicator (SFI); and
a front-loaded information field of the UEP coded TB encoded with a predetermined FEC code.

17. The apparatus of claim 16, wherein the allocation of individual coding rates to the CBGs or mTBs forming the UEP coded TB is performed inversely proportional to the CBGs or mTBs enclosed NAL unit of video coded data importance values within a total constraint of estimated coded bit rate capacity over the TB's transmission interval upon an available radio link resources and statistical information such that at least two different coding rates are allocated, $R_1 < R_2$, whereby a first lower coding rate $R_1$ is used for CBGs or mTBs enclosing higher importance valued NAL unit of video coded data or NAL unit of video coded data segments, and respectively, a second higher coding rate $R_2$ is used for CBGs or mTBs enclosing lower valued NAL unit of video coded data or NAL unit of video coded data segments.

18. A processor for wireless communication, comprising:
at least one controller coupled with at least one memory and configured to cause the processor to:
 detect a video coded traffic stream and a video codec profile for encoding the video coded traffic stream;
 determine an awareness of protocol data unit (PDU) sets of the video coded traffic stream, wherein each PDU set comprises at least one PDU that maps to an application data unit (ADU) comprising at least one network abstraction layer (NAL) unit of video coded data;
 align, based on at least the awareness of PDU sets, each PDU set of the video coded traffic stream to physical layer (PHY) transport elements and channel coding element partitions for a video coded traffic aware PHY transport;
 determine a channel coding rate allocation of the channel coding element partitions based on the video coded traffic aware PHY transport; and
 apply a forward error correction (FEC) coding to the channel coding element partitions based in part on the channel coding rate allocation.

19. A method, comprising:
detecting a video coded traffic stream and a video codec profile for encoding the video coded traffic stream;
determining an awareness of protocol data unit (PDU) sets of the video coded traffic stream, wherein each PDU set comprises at least one PDU that maps to an application data unit (ADU) comprising at least one network abstraction layer (NAL) unit of video coded data;
aligning, based on at least the awareness of PDU sets, each PDU set of the video coded traffic stream to physical layer (PHY) transport elements and channel coding element partitions for a video coded traffic aware PHY transport;
determining a channel coding rate allocation of the channel coding element partitions based on the video coded traffic aware PHY transport; and
applying a forward error correction (FEC) coding to the channel coding element partitions based in part on the channel coding rate allocation.

20. An apparatus, comprising:
at least one memory, and
at least one processor coupled with the at least one memory and configured to cause the apparatus to:
 receive a configuration comprising a video codec profile used to encode a video coded stream;
 receive a forward error correction (FEC) transmission of the video coded stream comprising physical layer (PHY) transport elements and subsequent channel coding element partitions corresponding to a video coded traffic aware PHY transport;
 receive a channel coding rate allocation of the channel coding element partitions based on the video coded traffic aware PHY transport;
 receive an indication of the video coded traffic aware PHY transport corresponding to an alignment of video coded network abstraction layer (NAL) units of the video coded traffic stream to the PHY transport elements and channel coding element partitions, the alignment based on an awareness of protocol data unit (PDU) sets of the video coded traffic stream, wherein each PDU set comprises at least one PDU that maps to an application data unit (ADU) comprising at least one NAL unit of video coded data;
 apply the FEC transmission of the video coded stream, the received channel coding rate allocation, and the indication of the video coded traffic aware PHY transport to perform channel decoding of the video coded stream to retrieve the corresponding PDU set corresponding to the NAL unit of video coded data; and
 use the configuration comprising the video codec profile to decode the video coded stream.

* * * * *